United States Patent
Piao et al.

(10) Patent No.: US 12,282,092 B2
(45) Date of Patent: Apr. 22, 2025

(54) METHOD FOR DETECTING MOVING TARGET BASED ON SPATIAL SLICES OF TRANSFORMED SPATIO-TEMPORAL FREQUENCY SPACE

(71) Applicant: Harbin Engineering University, Harbin (CN)

(72) Inventors: Shengchun Piao, Harbin (CN); Yunjia Shi, Harbin (CN); Junyuan Guo, Harbin (CN); Minghui Zhang, Harbin (CN)

(73) Assignee: HARBIN ENGINEERING UNIVERSITY (CN)

( * ) Notice: Subject to any disclaimer, the term of this patent is extended or adjusted under 35 U.S.C. 154(b) by 281 days.

(21) Appl. No.: 18/120,609

(22) Filed: Mar. 13, 2023

(65) Prior Publication Data
US 2023/0341547 A1    Oct. 26, 2023

(30) Foreign Application Priority Data
Apr. 22, 2022 (CN) .......................... 202210426030.3

(51) Int. Cl.
*G01S 15/50* (2006.01)
*G01S 15/88* (2006.01)
*G06F 17/11* (2006.01)

(52) U.S. Cl.
CPC .............. *G01S 15/50* (2013.01); *G01S 15/88* (2013.01); *G06F 17/11* (2013.01)

(58) Field of Classification Search
None
See application file for complete search history.

(56) References Cited

U.S. PATENT DOCUMENTS

| | | | |
|---|---|---|---|
| 7,173,562 B2 * | 2/2007 | Garren | G01S 13/9017 342/25 R |
| 11,520,043 B2 * | 12/2022 | Kruse | G10K 11/346 |
| 11,737,726 B2 * | 8/2023 | Kruse | G01S 15/8997 600/447 |

* cited by examiner

*Primary Examiner* — Isam A Alsomiri
*Assistant Examiner* — Vikas Atmakuri
(74) *Attorney, Agent, or Firm* — Onello & Mello, LLP

(57) ABSTRACT

The present disclosure belongs to the field of underwater target detection, and in particular, to a method for detecting a moving target based on spatial slices of transformed spatio-temporal frequency space. The method includes: segmenting a target radiated acoustic signal received by an M-element horizontal line array in an underwater acoustic environment with a low signal-to-noise ratio (SNR); performing N-point discrete Fourier transform (DFT) on the received signal on each array element in each period of time; performing frequency domain beamforming on an array signal after each section of DFT, and performing stacking after compensating a phase difference between arrays brought by an azimuth of each primitive element; performing coordinate transformation on a frequency-azimuth-time three-dimensional (3D) matrix space obtained; taking a slice from the obtained frequency-azimuth-time 3D space subjected to the coordinate transformation; and performing segmented Radon transform on the spatial slice obtained to detect the target.

18 Claims, 22 Drawing Sheets

METHOD FOR DETECTING MOVING TARGET BASED ON SPATIAL SLICES OF TRANSFORMED SPATIO-TEMPORAL FREQUENCY SPACE

CROSS REFERENCE TO RELATED APPLICATION

This patent application claims the benefit and priority of Chinese Patent Application No. 202210426030.3, filed with the China National Intellectual Property Administration on Apr. 22, 2022, the disclosure of which is incorporated by reference herein in its entirety as part of the present application.

TECHNICAL FIELD

The present disclosure belongs to the field of underwater target detection, and in particular, to a method for detecting a moving target based on spatial slices of transformed spatio-temporal frequency space, an electronic device, and a readable storage medium.

BACKGROUND

In the underwater acoustic environment with a low signal-to-noise ratio (SNR), the traditional signal detection methods seriously restrict the detection performance of the underwater sonar array. In recent years, the method for improving the SNR of a target signal using multi-frame data accumulation has become a research hotspot. A large amount of design analysis and computer simulation has demonstrated the advantages of the tracking algorithm before detection, but only a limited number of finished systems have been applied in practical work. One of the main reasons is that with the increase of integration time (frame number), the change of signal parameters caused by target movement cannot be ignored. Therefore, when the target movement parameters are unknown, it is impossible to accurately integrate the signal for a long time.

In the field of underwater acoustics, the research work based on long time integration to improve the SNR focuses on the discussion of parameters of the target in the frequency domain or the space domain. Most of them only consider the frequency change of the moving target alone or only analyze the target movement based on bearings-only. It is not until recent years that the processing and analysis method of spatio-temporal frequency combination is discussed. However, most of the solutions only consider the analysis of the moving parameters of the target in a high SNR environment, because the search problem of multidimensional movement parameters needs to be solved for the moving target in a low SNR environment. So far, there is still a lack of a simple, fast and effective method for multi-frame accumulation of moving targets with a low SNR.

SUMMARY

The present disclosure provides a method for detecting a moving target based on spatial slices of transformed spatio-temporal frequency space, so as to solve passive detection of uniformly moving targets in a low SNR environment, especially for targets with fast azimuth change.

The present disclosure provides an electronic device, configured to run steps of a method in a computer readable storage medium.

The present disclosure provides a computer readable storage medium, configured to store steps of the method for detecting a moving target based on spatial slices of transformed spatio-temporal frequency space.

The present disclosure is implemented through the following technical solutions.

The present disclosure provides a method for detecting a moving target based on spatial slices of transformed spatio-temporal frequency space, including the following steps:

step 1: segmenting a target radiated acoustic signal s(t) received by an M-element horizontal line array in an underwater acoustic environment with a low SNR;

step 2: performing N-point discrete Fourier transform (DFT) on the received signal on each array element in each period of time $\tau_p$ in step 1, where $N=T_0 \cdot f_s$;

step 3: performing frequency domain beamforming on an array signal after each section of DFT in step 2, and performing stacking after compensating a phase difference between arrays brought by an azimuth $\alpha(\tau_p)$ of each primitive element;

step 4: performing coordinate transformation on a frequency-azimuth-time (f-α-t) three-dimensional (3D) matrix space obtained in step 3;

step 5: taking a slice from the frequency-azimuth-time (f-cos θ-t) 3D space subjected to the coordinate transformation obtained in step 4; and step 6: performing segmented Radon transform on the spatial slice obtained in step 5 to detect the target.

In the method for detecting a moving target based on spatial slices of transformed spatio-temporal frequency space, step 1 is specifically as follows:

$$s_m(\tau_p,n)=s((\tau_p-1)T_b+n) \quad (1),$$

where $\tau_p=1,2,\ldots,P$, $n=1,2,\ldots,T_0 f_s$, and $m=1,2,\ldots,M$, and

P represents a number of segments into which data is divided, $\tau_p$ represents a p-th segment of signal, $T_0$ represents a length of each segment of signal, in unit of second, $T_b$ represents a segmentation stride, in unit of second, $f_s$ is a sampling rate of the signal, $\tau_p$ represents a slow time, n represents a fast time, and m is an array element number.

In the method for detecting a moving target based on spatial slices of transformed spatio-temporal frequency space, step 2 is specifically as follows:

$$s(\tau_p, \omega) = \frac{1}{N}\sum_{n=0}^{N-1} Ae^{i\vec{k}\cdot\vec{r}_0}e^{i\omega_p\tau_p}\begin{bmatrix} 1 \\ e^{-i\frac{2\pi f_0}{c}d\cos\alpha(\tau_p)} \\ \vdots \\ e^{-i\frac{2\pi f_0(M-1)}{c}d\cos\alpha(\tau_p)} \end{bmatrix} e^{i(\omega_p-\omega)n}, \quad (2)$$

where within $T_0$ seconds, a frequency $\omega_p$ and azimuth $\alpha(\tau_p)$ of the received signal are approximately unchanged, and $\omega_p=\omega_0+\vec{k}\cdot\vec{v}$ is a frequency received by the array at a time $\tau_p$ after the Doppler effect caused by target movement, where $\vec{v}$ is a target velocity vector, and $\vec{k}$ is a wave number vector; and $\vec{r}_0$ is a distance vector between the target and a central receiving array element at an initial time, d is an array element spacing, and both $\omega_0$ and $f_0$ are frequencies of the target transmitting a single-frequency signal.

In the method for detecting a moving target based on spatial slices of transformed spatio-temporal frequency space, step 3 is specifically as follows:

$$S(\tau_p, \omega, \alpha) = \sum_{m=1}^{M} s_m(\tau_p, \omega) e^{i\frac{2\pi f_0(m-1)}{c} d\cos\alpha} = \qquad (3)$$

$$\frac{1}{N}\sum_{m=1}^{M}\sum_{n=0}^{N-1} A e^{i\vec{k}\cdot\vec{r}_0} e^{i\omega_p \tau_p} e^{i(\omega_p-\omega)n} e^{-i\frac{2\pi f_0(m-1)}{c}d(\cos\alpha-\cos\alpha(\tau_p))},$$

where $\alpha=\alpha(\tau_p)$ represents the azimuth, M represents a number of array elements, m represents an m-th array element, $\tau_p$ represents a p-th segment of signal, i represents an imaginary unit, $\cos\alpha$ represents cosine of the azimuth, c represents an acoustic velocity, N represents a number of points in each segment of the segmented signal, N−1 represents a point position, and $\vec{k}$ is the wave number vector; and $\vec{r}_0$ is the distance vector between the target and the central receiving array element at the initial time.

In the method for detecting a moving target based on spatial slices of transformed spatio-temporal frequency space, step 3 is specifically as follows:
according to a mathematical expression of space transformation:

$$\begin{cases} f' = f \\ t' = t \\ \cos\theta = -\sin(\alpha-\gamma_0) \end{cases} \qquad (4)$$

where $\gamma_0 \in [0,360)$, and $\gamma_0$ is an angle measured clockwise from a true north line to a target course line,
searching the angle $\gamma_0$, and performing coordinate transformation as shown in Formula (4) on the (f-α-t) 3D space according to the parameter to obtain a new 3D space (f-cos θ-t):

$$S(f, \cos\theta, t) = e^{i\vec{k}\cdot\vec{r}_0}\delta(\cos\theta - \cos\theta(t))\delta\left(f - \left[f_0 + f_0\frac{v}{c}\cos\theta(t)\right]\right),$$

where
the signal is represented as a curve on a plane $$f - \left(f_0 + f_0\frac{v}{c}\cos\theta\right) = 0$$

in the new 3D space.

In the method for detecting a moving target based on spatial slices of transformed spatio-temporal frequency space, step 5 is specifically as follows: searching a transmitting signal frequency $f_0$ and a velocity v, and determining a slice in the 3D space A:

$$f - \left(f_0 + f_0\frac{v}{c}\cos\theta\right) = 0$$

according to the parameters.

The present disclosure provides a computer readable storage medium, storing a computer program. When executed by a processor, the computer program implements steps of the above-described method.

The present disclosure provides an electronic device, including a processor, a communication interface, a memory, and a communication bus. The processor, the communication interface, and the memory communicate with each other through the communication bus.

The memory is configured to store a computer program.

The processor is configured to implement steps of the above-described method when executing the program stored in the memory.

The present disclosure has the following beneficial effects:

The present disclosure improves the detection performance of the underwater sonar array.

The method of the present disclosure is simple, fast, and effective.

The present disclosure increases the processing time of the moving target signal.

Compared with a low frequency array (LOFAR) diagram and an azimuth history diagram, the present disclosure can display the change of frequency and azimuth with time more excellently.

The present disclosure is conducive to the detection of targets whose azimuth varies greatly with time.

The algorithm of the present disclosure has low computation.

BRIEF DESCRIPTION OF THE DRAWINGS

FIG. 3A shows a curve diagram of the signal in a 3D space (f-α-t), FIG. 3B shows a top view of the 3D space (f-α-t), FIG. 3C shows a side view of the 3D space (f-α-t), and FIG. 3D shows a front view of the 3D space (f-α-t);

FIG. 4A shows a curve diagram of the signal in a 3D space (f-cos θ-t), FIG. 4B shows a top view of the 3D space (f-cos θ-t), FIG. 4C shows a side view of the 3D space (f-cos θ-t), and FIG. 4D shows a front view of the 3D space (f-cos θ-t);

FIG. 6A shows a 64 Hz LOFAR diagram, FIG. 6B shows a 67 Hz LOFAR diagram, FIG. 6C shows a 70 Hz LOFAR diagram, and FIG. 6D shows a 73 Hz LOFAR diagram;

FIG. 7A shows a 64 Hz azimuth history diagram, FIG. 7B shows a 67 Hz azimuth history diagram, FIG. 7C shows a 70 Hz azimuth history diagram, and FIG. 7D shows a 73 Hz azimuth history diagram; FIG. 8A shows a 64 Hz effect diagram, FIG. 8B shows a 67 Hz effect diagram, FIG. 8C shows a 70 Hz effect diagram, and FIG. 8D shows a 73 Hz effect diagram.

DETAILED DESCRIPTION OF THE EMBODIMENTS

Figure 1:
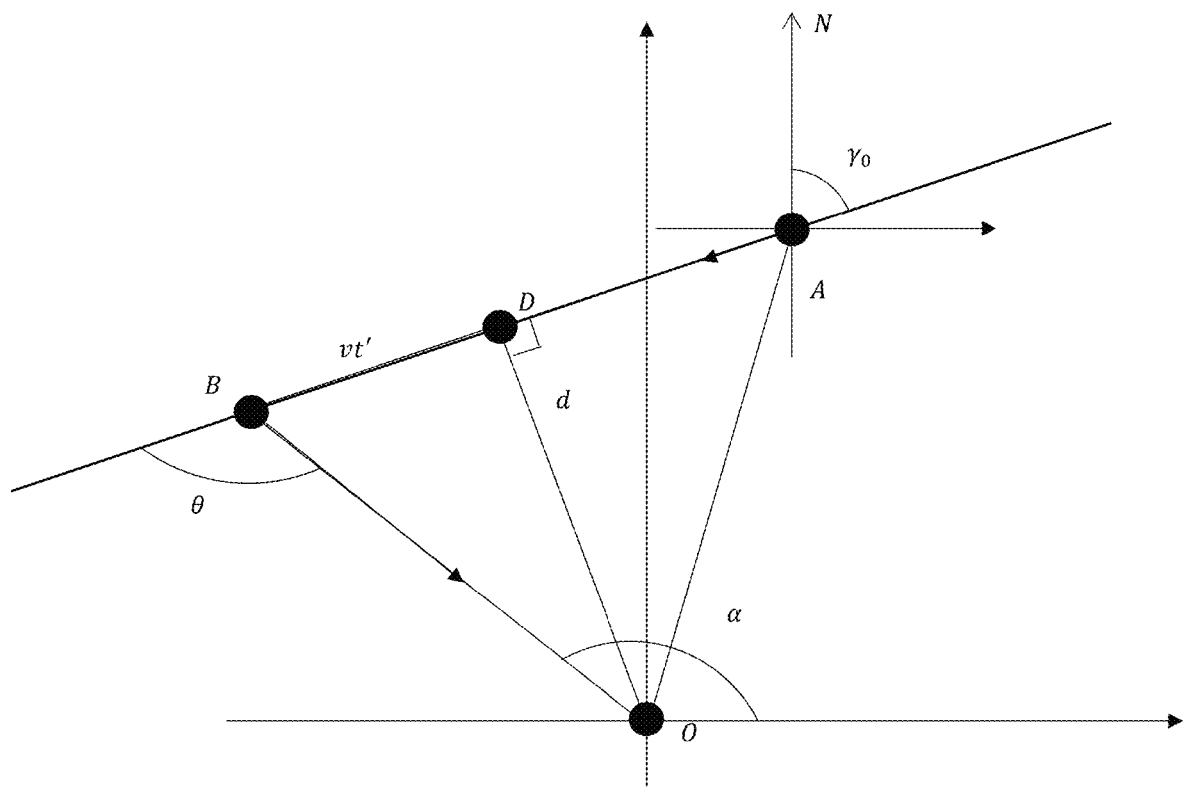
FIG. 1 is a schematic diagram of a target movement model of the present disclosure.
Figure 2:
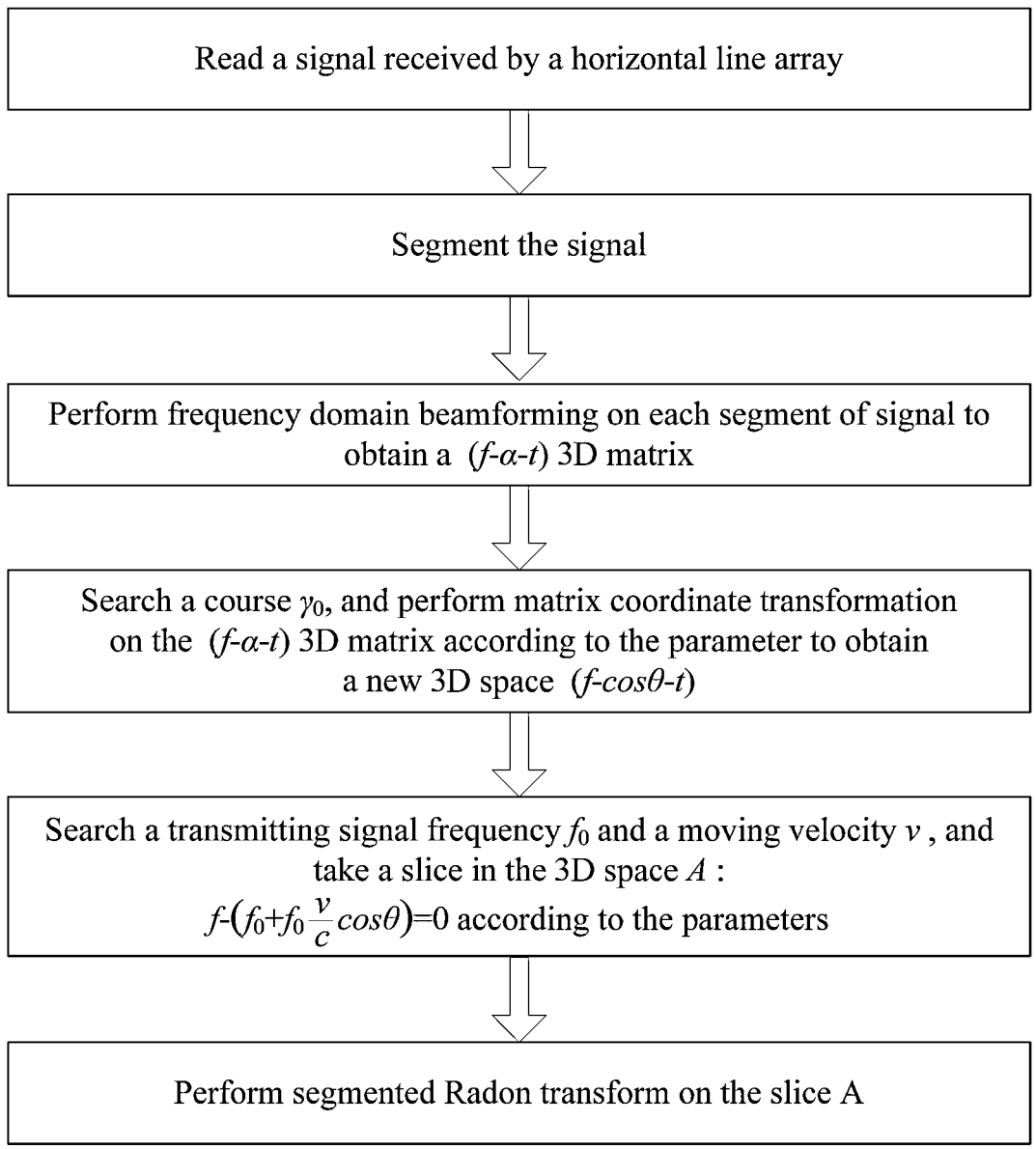
FIG. 2 is a flowchart of a method of the present disclosure.
Figure 3A:
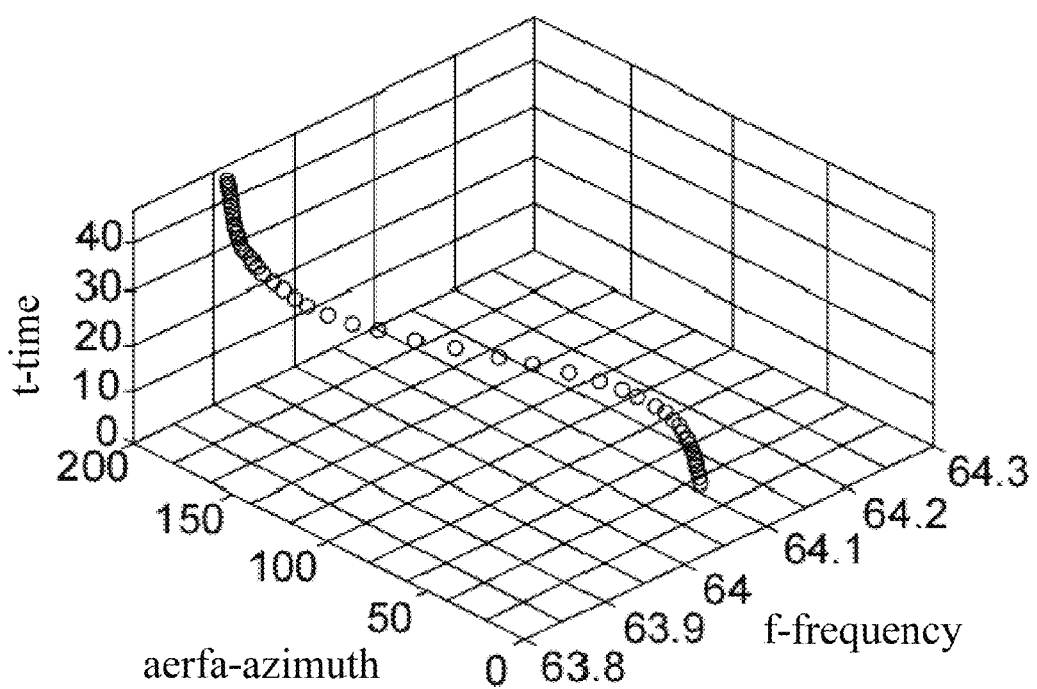
FIGS. 3A-D are schematic diagrams of a position of a signal in a 3D space of the present disclosure, where
Figure 3B:
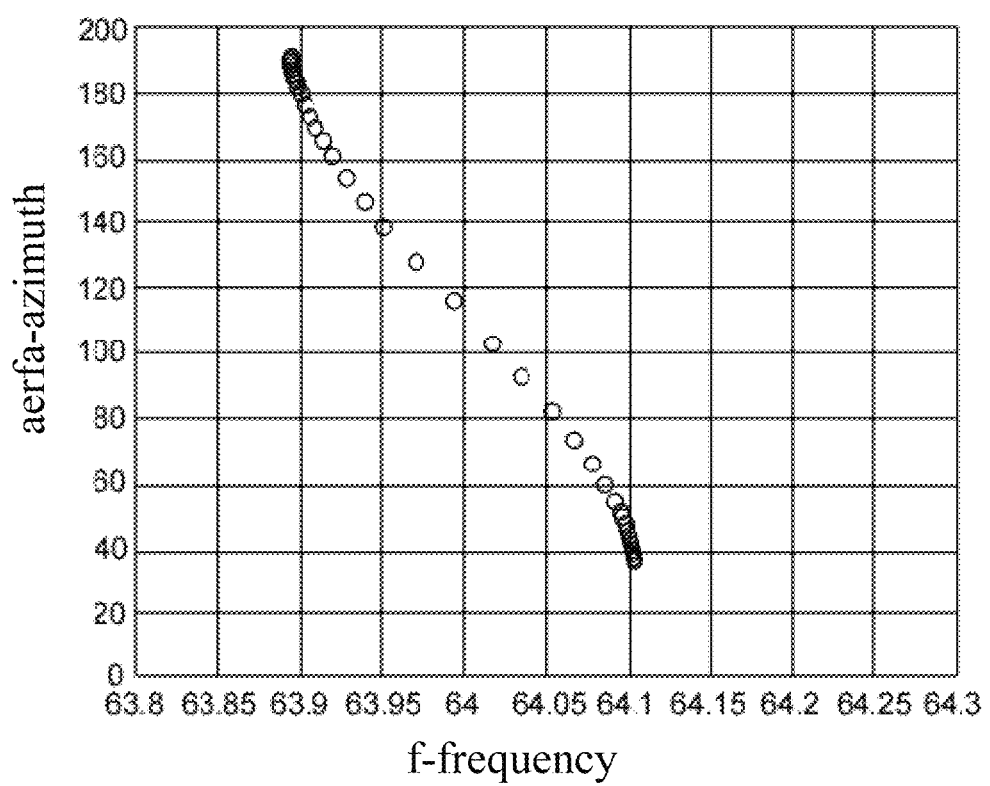
Figure 3C:
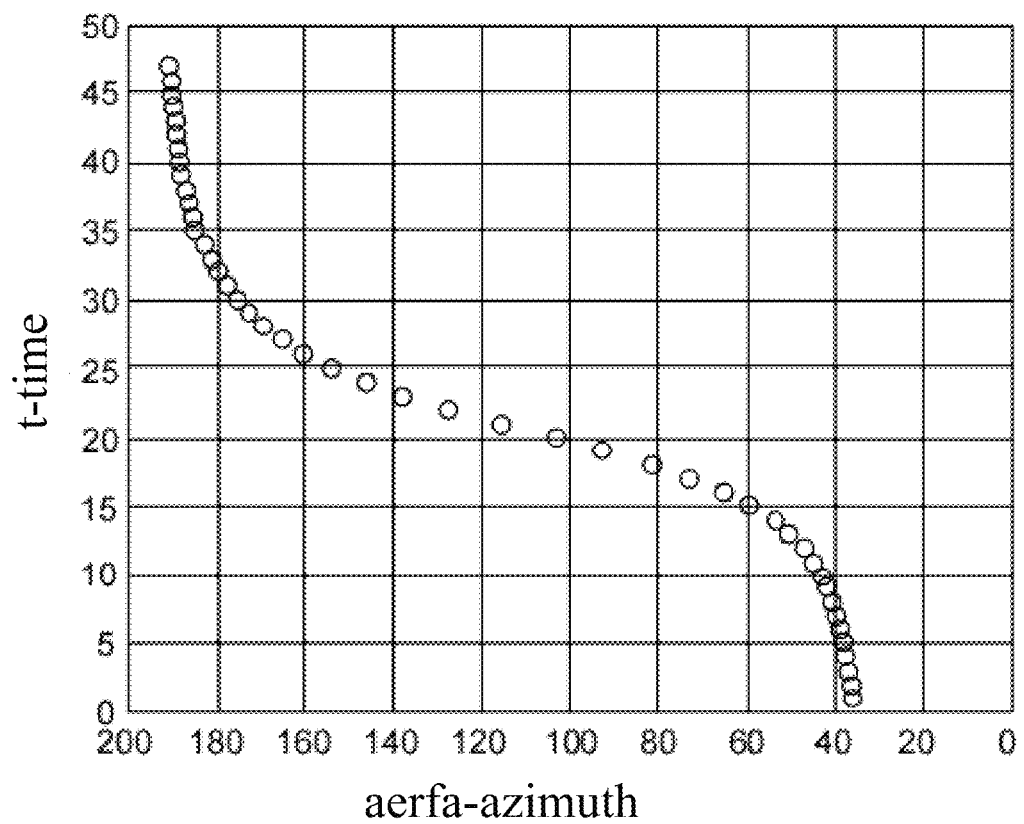
Figure 3D:
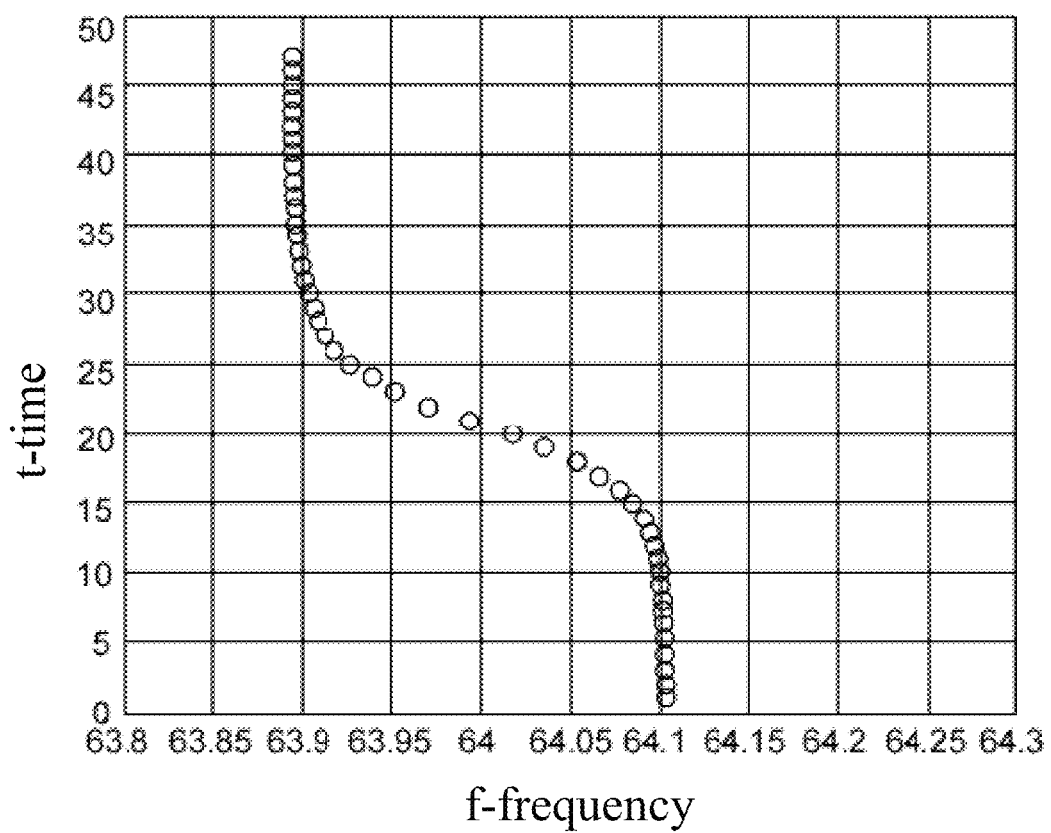
Figure 4A:
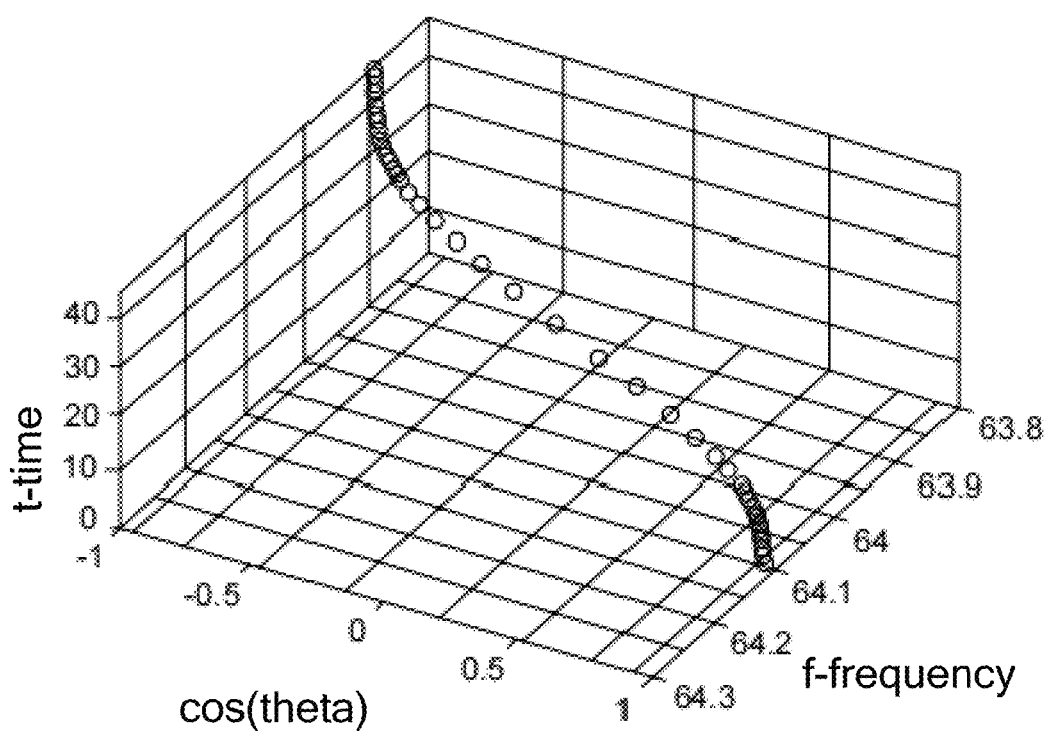
FIGS. 4A-D are schematic diagrams of a position of a signal in a 3D space of the present disclosure, where
Figure 4B:
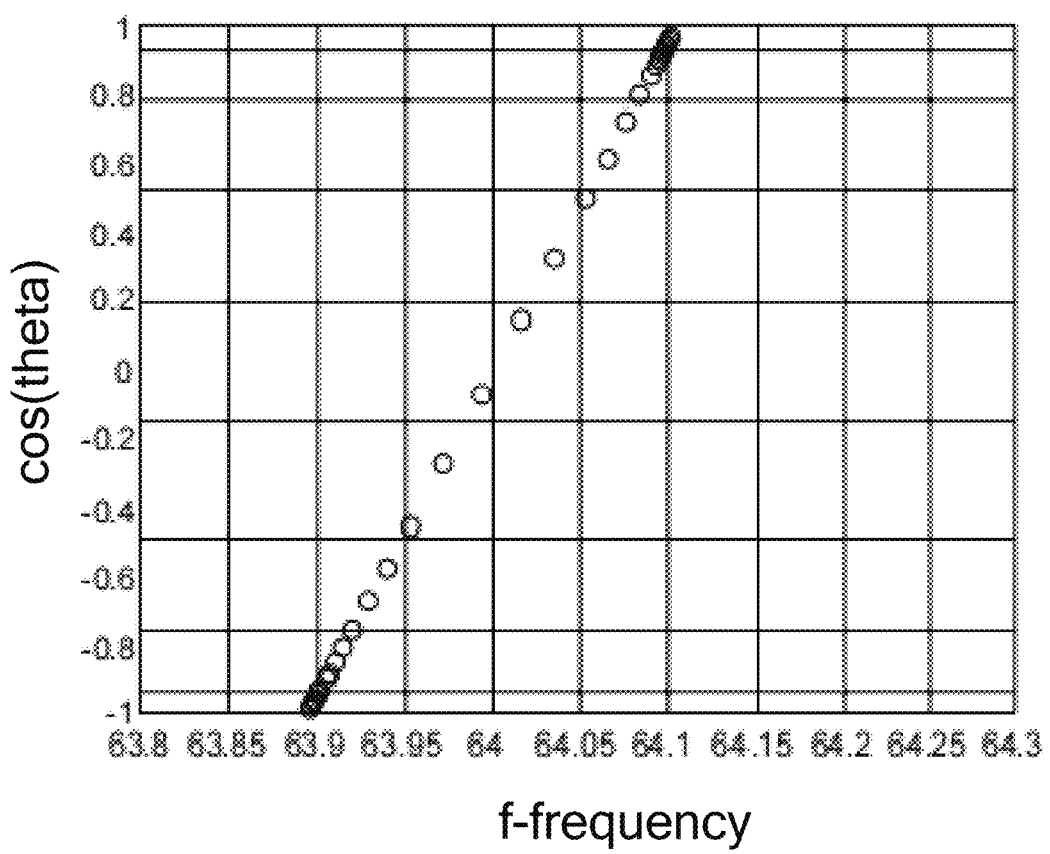
Figure 4C:
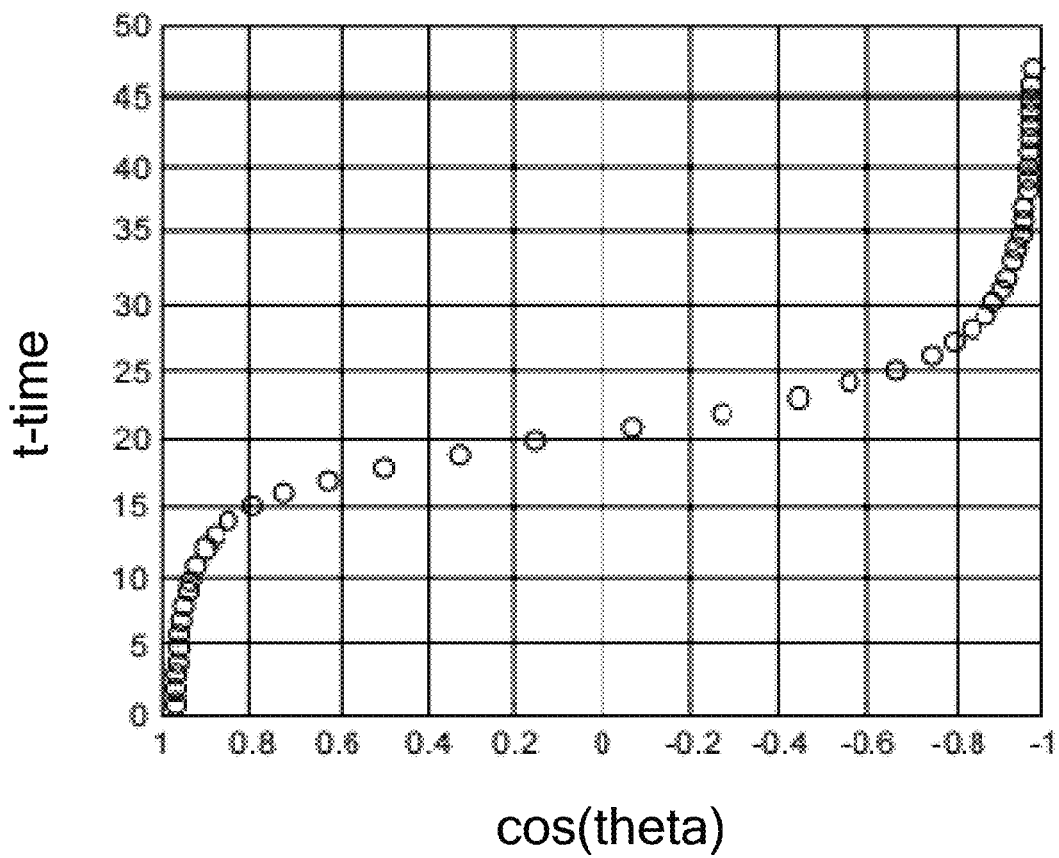
Figure 4D:
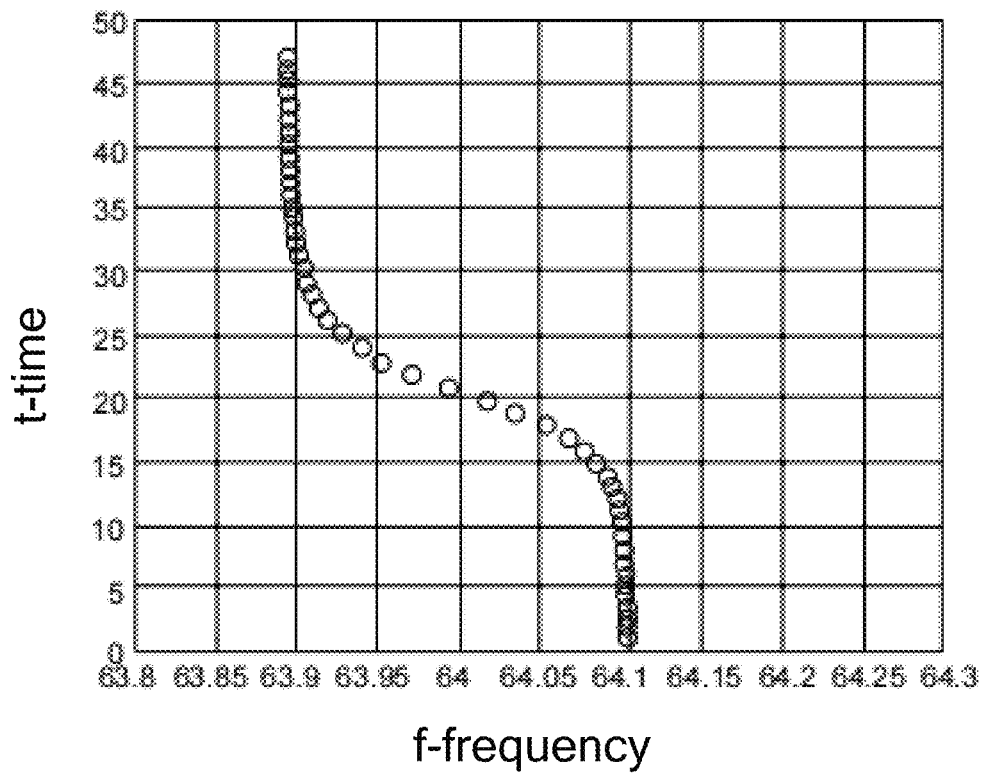

The technical solutions of the embodiments of the present disclosure are clearly and completely described below with reference to the accompanying drawings. Apparently, the described embodiments are only illustrative ones, and are not all possible ones of the present disclosure. All other embodiments obtained by those of ordinary skill in the art based on the embodiments of the present disclosure without creative efforts shall fall within the protection scope of the present disclosure.

The present disclosure provides a method for detecting a moving target based on spatial slices of transformed spatio-temporal frequency space, including the following steps.

Step 1: A target radiated acoustic signal s(t) received by an M-element horizontal line array in an underwater acoustic environment with a low SNR is segmented.

Step 2: N-point DFT is performed on the received signal on each array element in each period of time $\tau_p$ in step 1, where $N=T_0 \cdot f_s$.

For the azimuth $\alpha(\tau_p)$, each period of time $\tau_p$ has an azimuth $\alpha(\tau_p)$, and step S3 compensates this azimuth for each segment of signal. However, during compensation, the azimuth is unknown, so it is compensated once in sequence from 0 to 180 degrees. In the formula, $\alpha$ is a variable, and $\alpha(\tau_p)$ is a constant.

Step 3: Frequency domain beamforming is performed on an array signal after each section of DFT in step 2, and stacking is performed after a phase difference between arrays brought by an azimuth $\alpha(\tau_p)$ of each primitive element is compensated.

Step 4: Coordinate transformation is performed on a frequency-azimuth-time (f-α-t) 3D matrix space obtained in step 3.

Step 5: A slice is taken from the frequency-azimuth-time (f-cos θ-t) 3D space subjected to the coordinate transformation obtained in step 4.

Step 6: Segmented Radon transform is performed on the spatial slice obtained in step 5 to detect the target.

In the method for detecting a moving target based on spatial slices of transformed spatio-temporal frequency space, step 1 is specifically as follows:

$$(\tau_p, n) = s((\tau_p - 1)T_b + n) \quad (1),$$

where $$\tau_p = 1, 2, \ldots, P, \; n = 1, 2, \ldots, T_0 f_s, \text{ and } m = 1, 2, \ldots, M, \text{ and}$$

P represents a number of segments into which data is divided, $\tau_p$ represents a p-th segment of signal, $T_0$ represents a length of each segment of signal, in unit of second, $T_b$ represents a segmentation stride, in unit of second, $f_s$ is a sampling rate of the signal, $\tau_p$ represents a slow time, n represents a fast time, and m is an array element number.

In the method for detecting a moving target based on spatial slices of transformed spatio-temporal frequency space, step 2 is specifically as follows:

$$s(\tau_p, \omega) = \frac{1}{N} \sum_{n=0}^{N-1} A e^{i \vec{k} \cdot \vec{r}_0} e^{i \omega_p \tau_p} \begin{bmatrix} 1 \\ e^{-i \frac{2\pi f_0}{c} d \cos \alpha(\tau_p)} \\ \ldots \\ e^{-i \frac{2\pi f_0 (M-1)}{c} d \cos \alpha(\tau_p)} \end{bmatrix} e^{i(\omega_p - \omega) n}, \quad (2)$$

Within $T_0$ seconds, a frequency $\omega_p$ and azimuth $\alpha(\tau_p)$ of the received signal are approximately unchanged, and $\omega_p = \omega_0 + \vec{k} \cdot \vec{v}$ is a frequency received by the array at a time $\tau_p$ after the Doppler effect caused by target movement, where $\vec{v}$ is a target velocity vector, and $\vec{k}$ is a wave number vector; and $\vec{r}_0$ is a distance vector between the target and a central receiving array element at an initial time, d is an array element spacing, and both $\omega_0$ and $f_0$ are frequencies of the target transmitting a single-frequency signal.

In the method for detecting a moving target based on spatial slices of transformed spatio-temporal frequency space, step 3 is specifically as follows:

$$S(\tau_p, \omega, \alpha) = \sum_{m=1}^{M} s_m(\tau_p, \omega) e^{i \frac{2\pi f_0 (m-1)}{c} d \cos \alpha} = \quad (3)$$

$$\frac{1}{N} \sum_{m=1}^{M} \sum_{n=0}^{N-1} A e^{i \vec{k} \cdot \vec{r}_0} e^{i \omega_p \tau_p} e^{i(\omega_p - \omega) n} e^{-i \frac{2\pi f_0 (m-1)}{c} d (\cos \alpha - \cos \alpha(\tau_p))},$$

where $\alpha = \alpha(\tau_p)$ represents the azimuth, M represents a number of array elements, m represents an m-th array element, $\tau_p$ represents a p-th segment of signal, i represents an imaginary unit, cos α represents cosine of the azimuth, c represents an acoustic velocity, N represents a number of points in each segment of the segmented signal, N−1 represents a point position, and $\vec{k}$ is the wave number vector; and $\vec{r}_0$ is the distance vector between the target and the central receiving array element at the initial time.

In the method for detecting a moving target based on spatial slices of transformed spatio-temporal frequency space, step 3 is specifically as follows.

According to a mathematical expression of space transformation:

$$\begin{cases} f' = f \\ t' = t \\ \cos \theta = -\sin(\alpha - \gamma_0) \end{cases}, \quad (4)$$

where $\gamma_0 \in [0, 360)$, and $\gamma_0$ is an angle measured clockwise from a true north line to a target course line, and is a constant, the angle $\gamma_0$ is searched, and coordinate transformation as shown in Formula (4) is performed on the (f-α-t) 3D space according to the parameter to obtain a new 3D space (f-cos θ-t):

$$S(f, \cos \theta, t) = e^{i \vec{k} \cdot \vec{r}_0} \delta(\cos \theta - \cos \theta(t)) \delta\left(f - \left[f_0 + f_0 \frac{v}{c} \cos \theta(t)\right]\right).$$

The signal is represented as a curve on a plane $$f - \left(f_0 + f_0 \frac{v}{c} \cos \theta\right) = 0$$

in the new 3D space.

In the method for detecting a moving target based on spatial slices of transformed spatio-temporal frequency space, step 5 is specifically as follows: searching a transmitting signal frequency $f_0$ and a velocity v, and determining a slice in the 3D space A:

$$f - \left(f_0 + f_0 \frac{v}{c} \cos \theta\right) = 0$$

according to the parameters.

The present disclosure provides a computer readable storage medium, storing a computer program. When executed by a processor, the computer program implements steps of the method described above.

The present disclosure provides an electronic device, including a processor, a communication interface, a memory, and a communication bus. The processor, the communication interface, and the memory communicate with each other through the communication bus.

The memory is configured to store a computer program.

The processor is configured to implement steps of the method described above when executing the program stored in the memory.

FIG. 1 shows a target movement model established herein. First of all, it is assumed that the receiving device placed underwater is a uniform horizontal line array with M array elements. The reference array and the equivalent acoustic center of the line array are located at the origin of coordinates, and the moving target moves uniformly in a straight line from the initial point $A(x_0, y_0)$ at $\vec{v}$, radiating a single frequency signal with an angular frequency of $\omega_0$. The course $\gamma_0$, $\gamma_0 \in [0,360)$ is an angle measured clockwise from a true north line to a target course line, and is a constant. At a time t, the target moves to the point B, and the relative bearing $\theta$, $\theta \in [0,180]$ is an included angle between the moving direction of the target and the distance vector $\overrightarrow{BO}$ of the target position. $\alpha$ is the target azimuth, that is, the angle between the vector $\overrightarrow{OB}$ and the x-axis of the line between the target position and the equivalent acoustic center of the array. $\theta$ and $\alpha$ change continuously with the target movement or time, which can be expressed as the function $\theta(t)$ and $\alpha(t)$ of the time t. Only considering the movement of the target in the first and second quadrants, the position relation between the three angles cos $\theta$, $\alpha$, and $\gamma_0$ is:

$$\cos \theta(t) = -\sin(\alpha(t) + \gamma_0).$$

Assuming that the acoustic field is an infinite free plane and the receiving array is located in the far field of the signal source, the received signal can be approximately considered as a plane wave. Within a period of time, due to the Doppler effect brought by the target movement, the signal received by the array element at the origin of coordinates is:

$$s_1(t) = e^{i(\vec{k}\cdot\vec{r}_0 - (\omega_0 + \vec{k}\cdot\vec{v})t)},$$

where $\vec{k}$ is a wave number vector. The coordinate of any array element located on the x-axis can be expressed as (x, 0). According to the plane wave incidence principle, the phase difference between the received signal of this array element and the central array element is $$e^{-i\frac{\omega_0}{c}x \cos \alpha},$$

then the signal received by any array element can be written as:

$$s(t, x) = e^{i\left(\vec{k}\cdot\vec{r}_0 - \left(\omega_0 + \frac{\omega_0}{c}v\cos\theta\right)t - \frac{\omega_0}{c}x\cos\alpha(t)\right)}.$$

According to the moving target model in FIG. 1, it can be seen that the azimuth of the target changes with time, and changes with the radial velocity of the target movement. Due to the Doppler effect, the received frequency also changes with time, and a non-stationary signal is received. Therefore, the above array signals are subjected to the spatio-temporal two-dimensional (2D) short-time Fourier transform, that is, the time window function $\gamma^*(t'-t)$ is multiplied by the source signal s(t', x) to achieve the interception and translation of the source signal, and the signal in the spatio-temporal domain is subjected to the 2D Fourier transform to obtain the frequency-azimuth domain of the signal. The result after transformation can be expressed by the following formula:

$$S(f,\alpha,t) = \int_{-\infty}^{+\infty}\int_{-\infty}^{+\infty} s(t',x)\gamma^*(t'-t)e^{-i2\pi(ft'+x\cos\alpha)}dt dx.$$

By substituting Formula (3), the formula is simplified into:

$$S(f, \alpha, t) = e^{i\vec{k}\cdot\vec{r}_0}\delta(\alpha - \alpha(t))\delta(f - f(\tau_p)).$$

By sliding the window function and performing the 2D Fourier transform, the function expression of the received signal in the 3D space represented by the three axes of frequency-azimuth-time (f-$\alpha$-t) is obtained. As shown in FIGS. 3A-D, it is a curve on the surface in the 3D space.

According to the above derivation, the frequency of the received signal at any time is:

$$f(t) = f_0 + f_0 \frac{v}{c} \cos \theta(t).$$

Since $f_0$, v, and c are all constants, the relationship between f(t) and cos $\theta$(t) is linear. Therefore, according to the mathematical expression of space transformation:

$$\begin{cases} f' = f \\ t' = t \\ \cos \theta = -\sin(\alpha + \gamma_0) \end{cases},$$

the angle $\gamma_0$ is searched, and coordinate transformation as shown in Formula (6) is performed on the (f-$\alpha$-t) 3D space according to the parameter to obtain a new 3D space (f-cos $\theta$-t). The position of the signal in (f-cos $\theta$-t) is shown in FIGS. 4A-D. Since the relationship between f(t) and cos $\theta$(t) is linear, it can be seen that the points representing the signal in the top view of FIG. 4(B) form a straight line, that is, the signal can be represented as a curve on the plane $$f - \left(f_0 + f_0 \frac{v}{c}\cos\theta\right) = 0$$

in the new 3D space, whose equation is:

$$S(f, \cos\theta, t) = e^{i\vec{k}\cdot\vec{r}_0}\delta(\cos\theta - \cos\theta(t))\delta\left(f - \left[f_0 + f_0 \frac{v}{c}\cos\theta(t)\right]\right).$$

Figure 5:
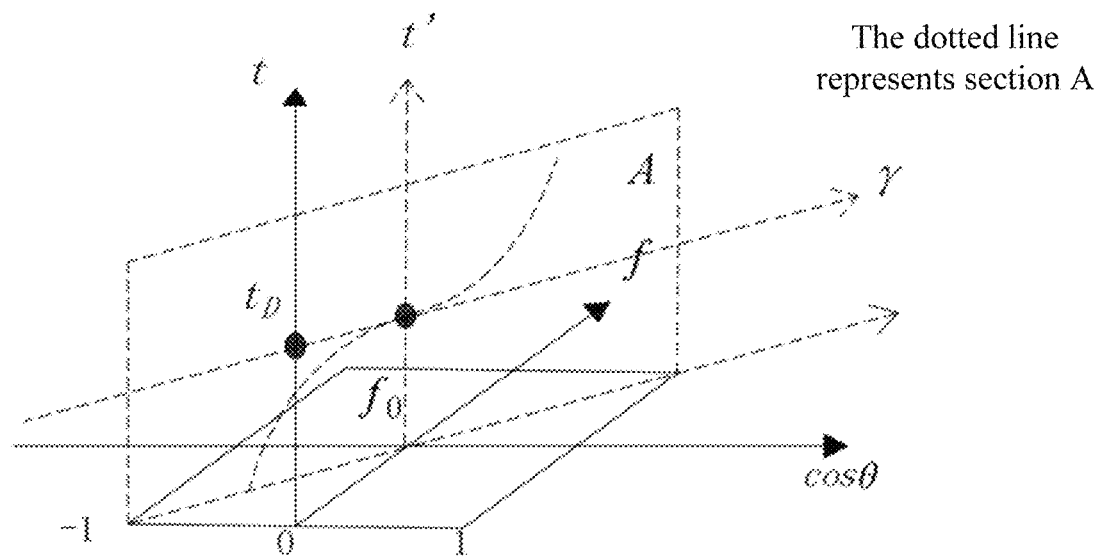
FIG. 5 is a schematic diagram of taking a slice in the 3D space of the present disclosure.
Figure 6A:
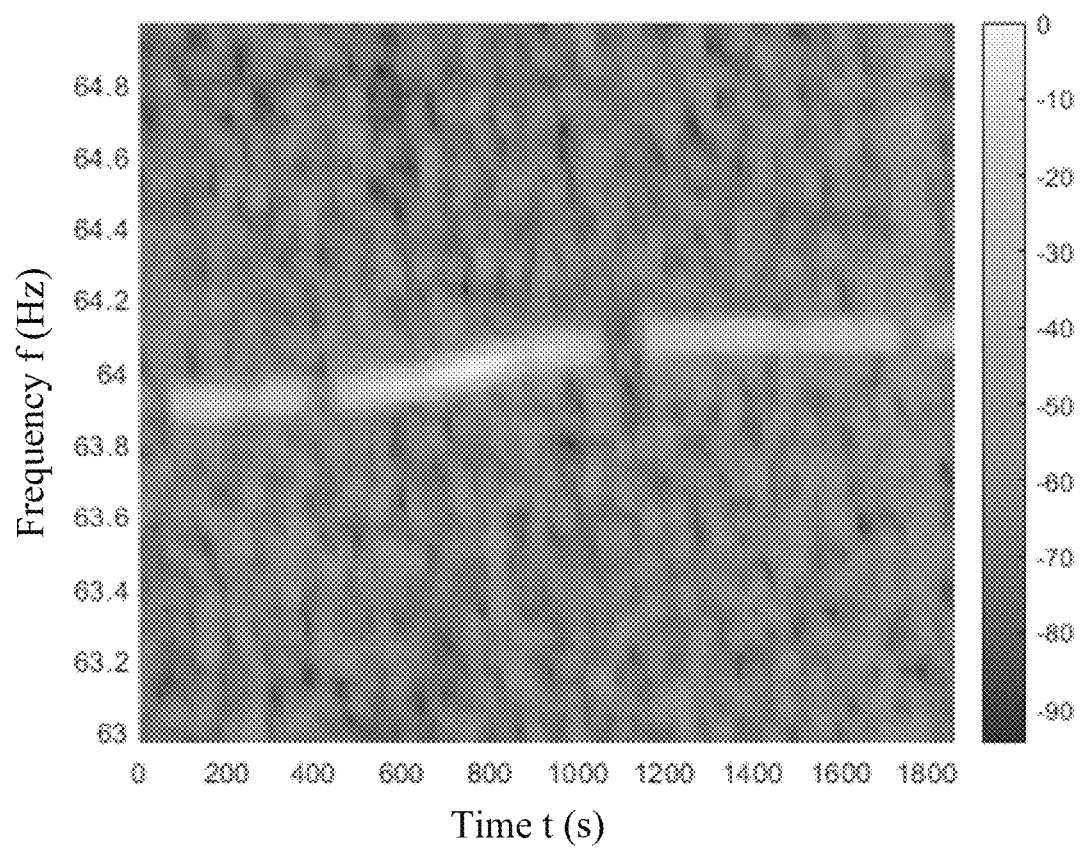
FIGS. 6A-D are LOFAR diagrams of the present disclosure, where
Figure 6B:
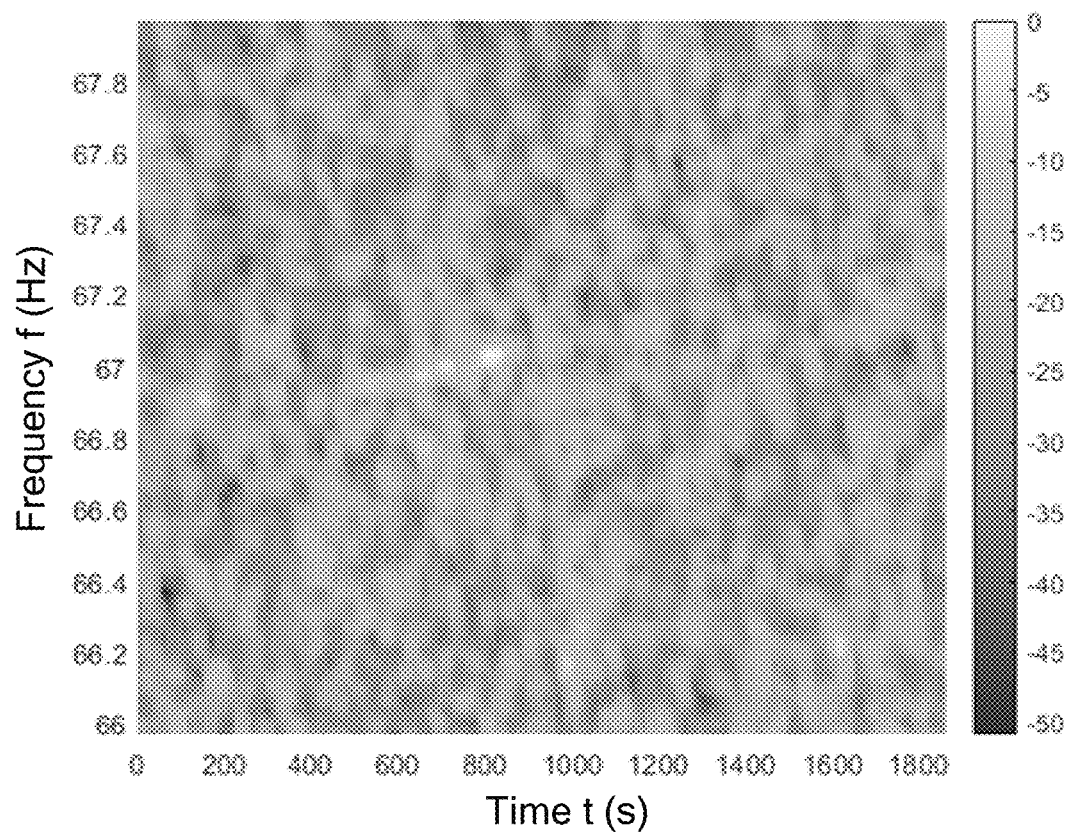
Figure 6C:
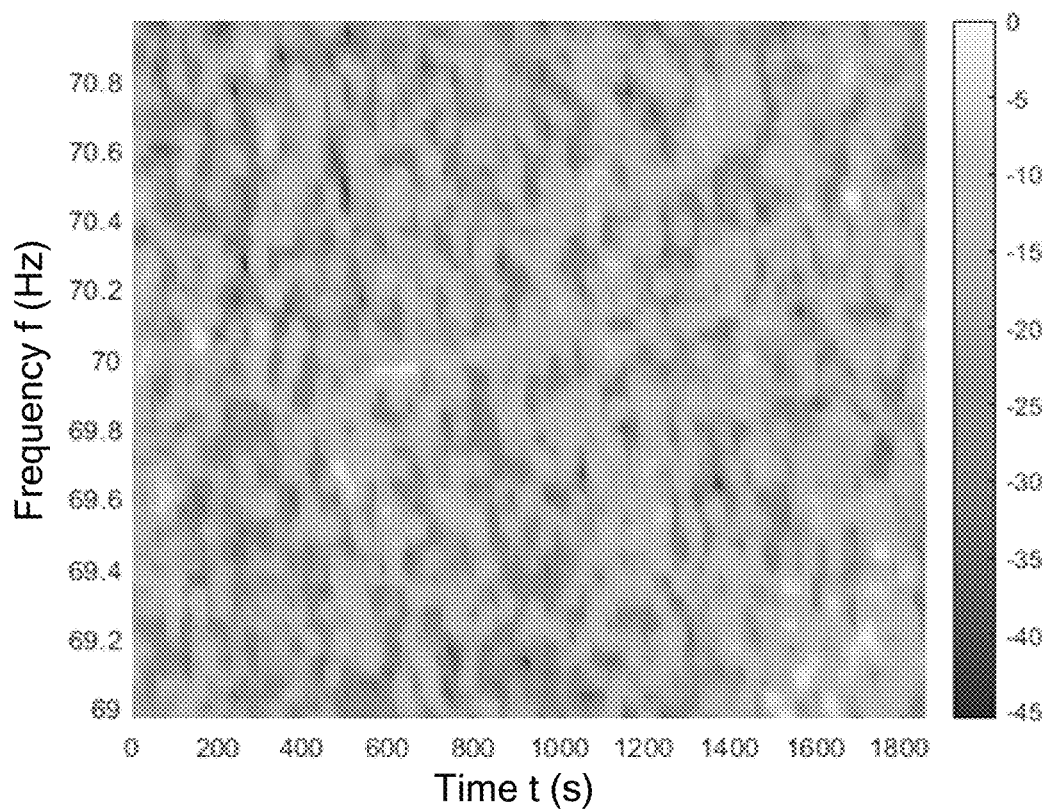
Figure 6D:
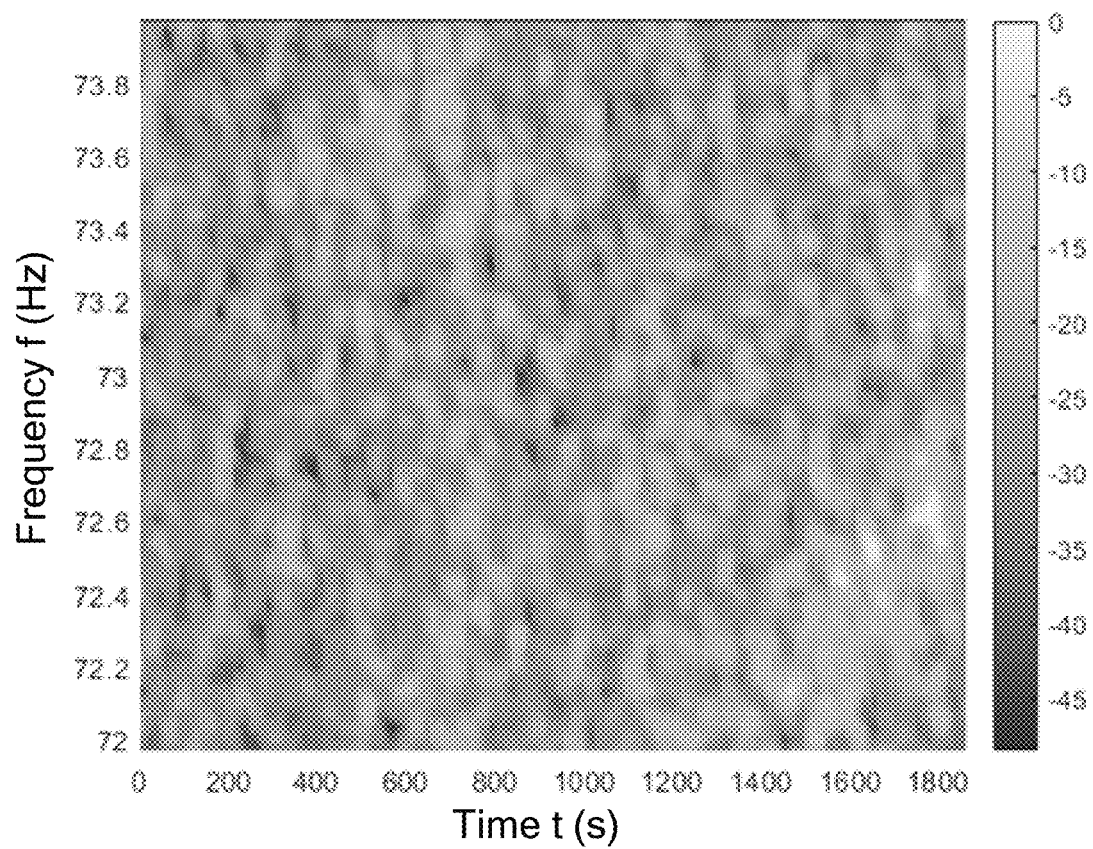
Figure 7A:
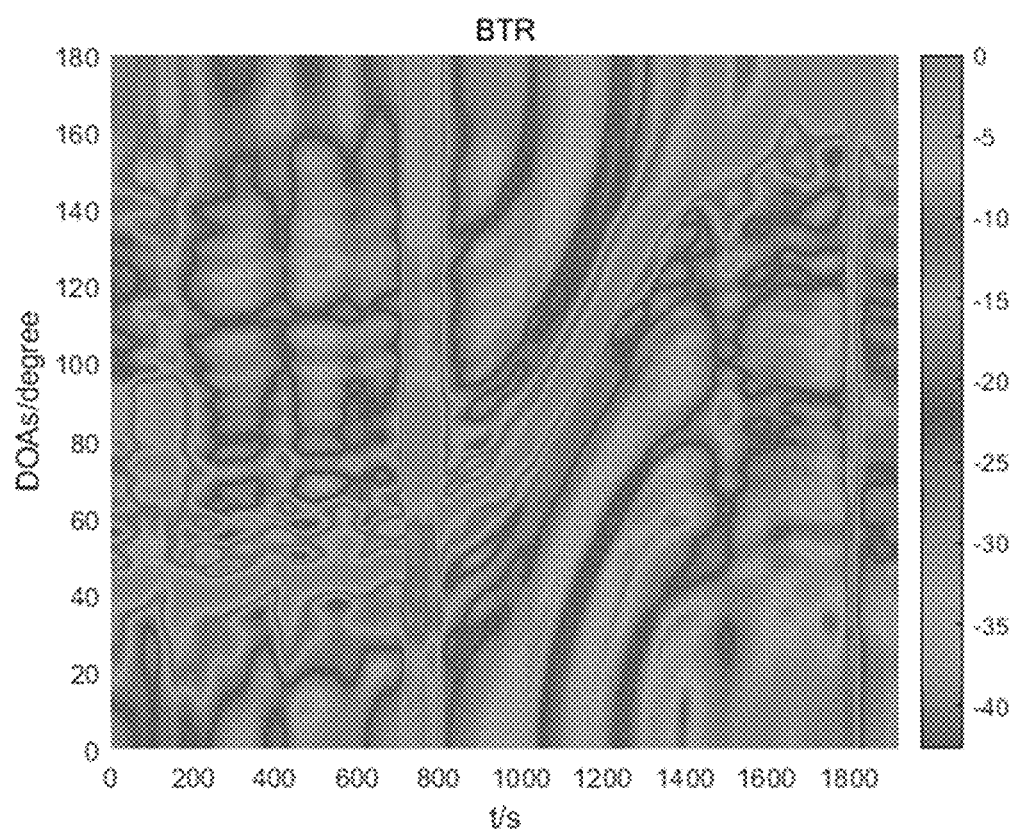
FIGS. 7A-D are azimuth history diagrams of the present disclosure, where
Figure 7B:
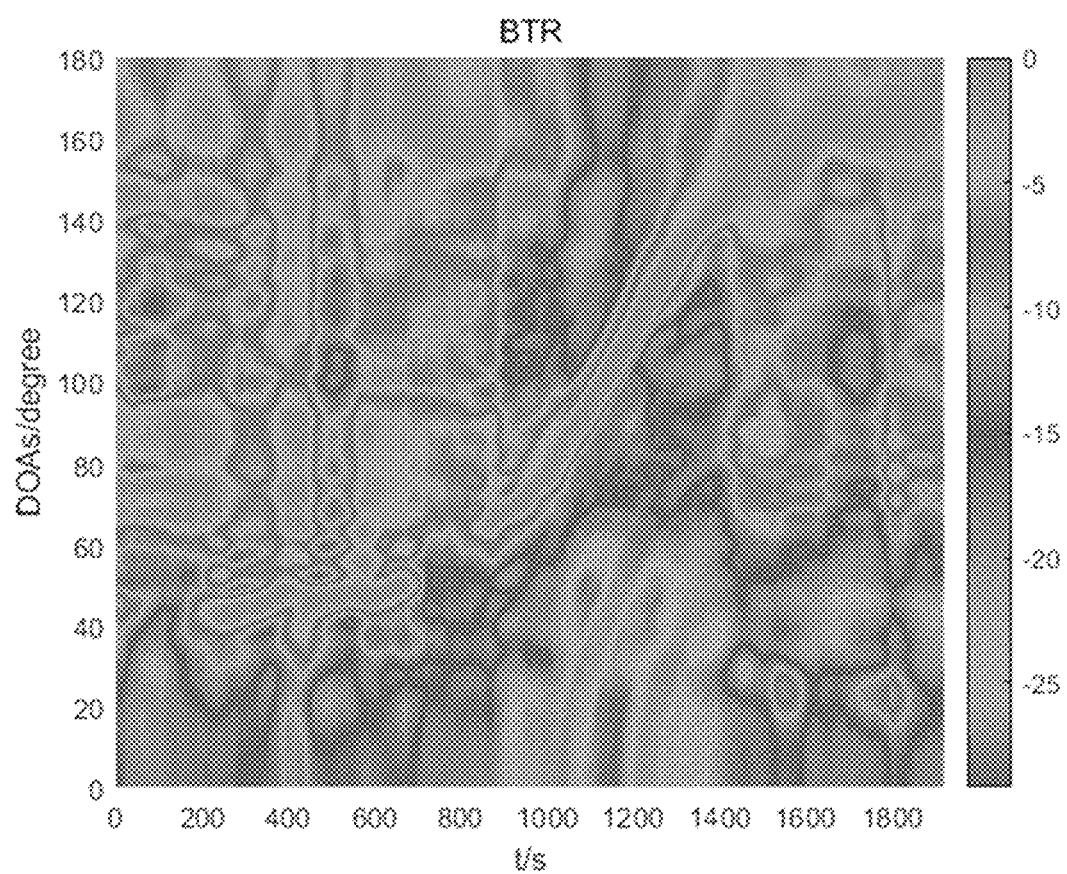
Figure 7C:
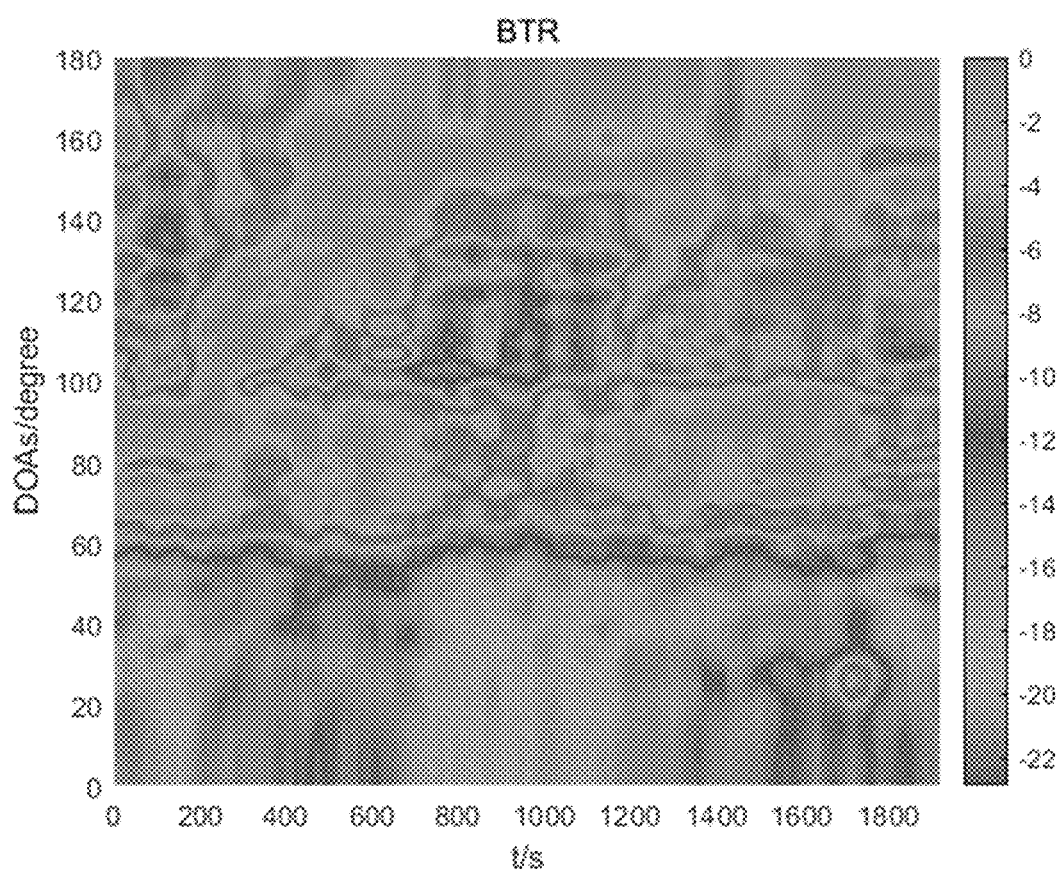
Figure 7D:
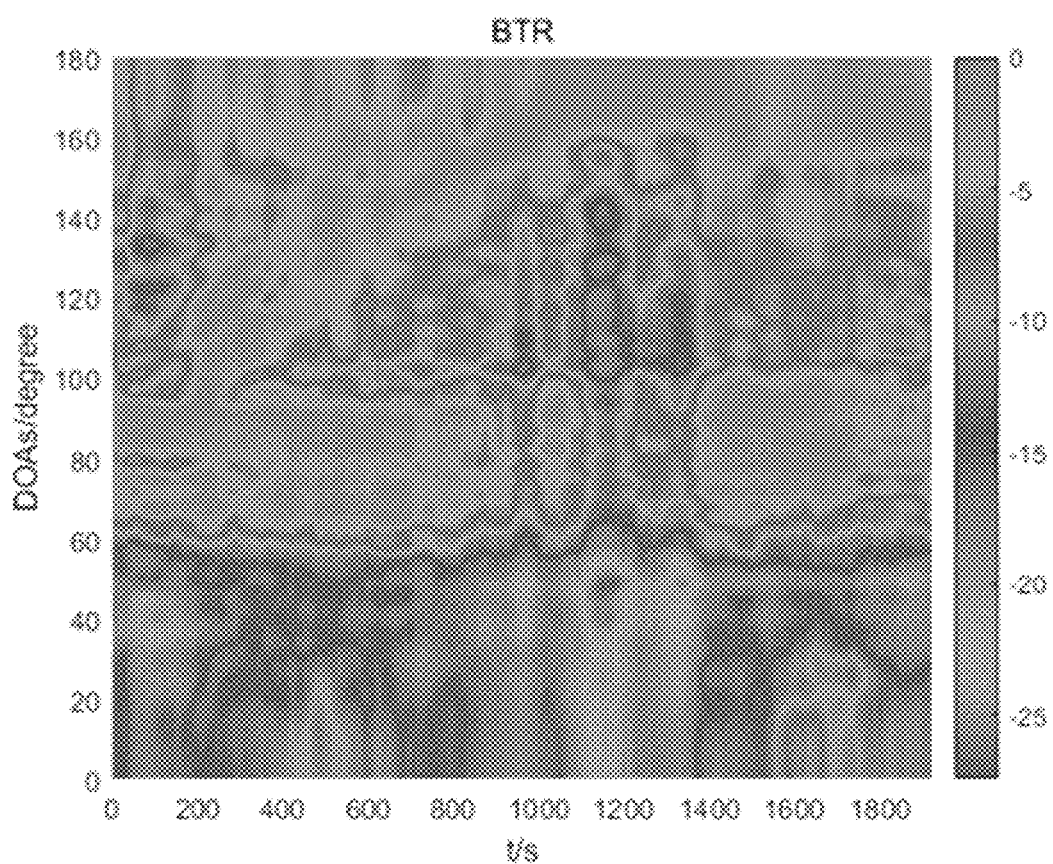
Figure 8A:
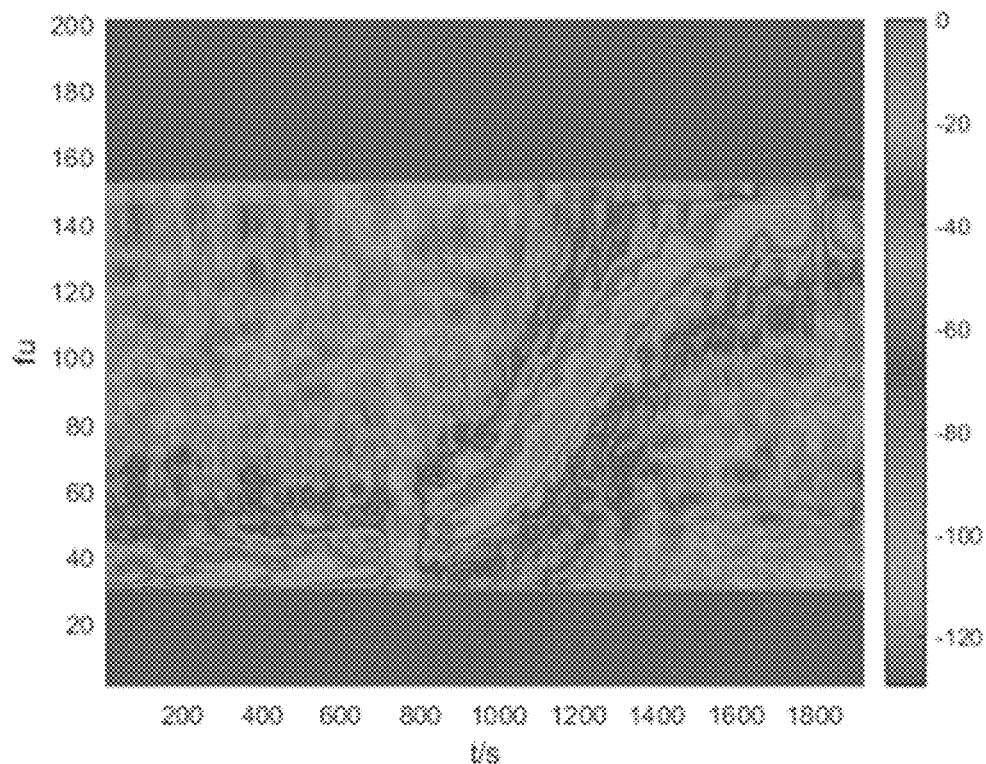
FIGS. 8A-D are effect diagrams of the present disclosure, where
Figure 8A:
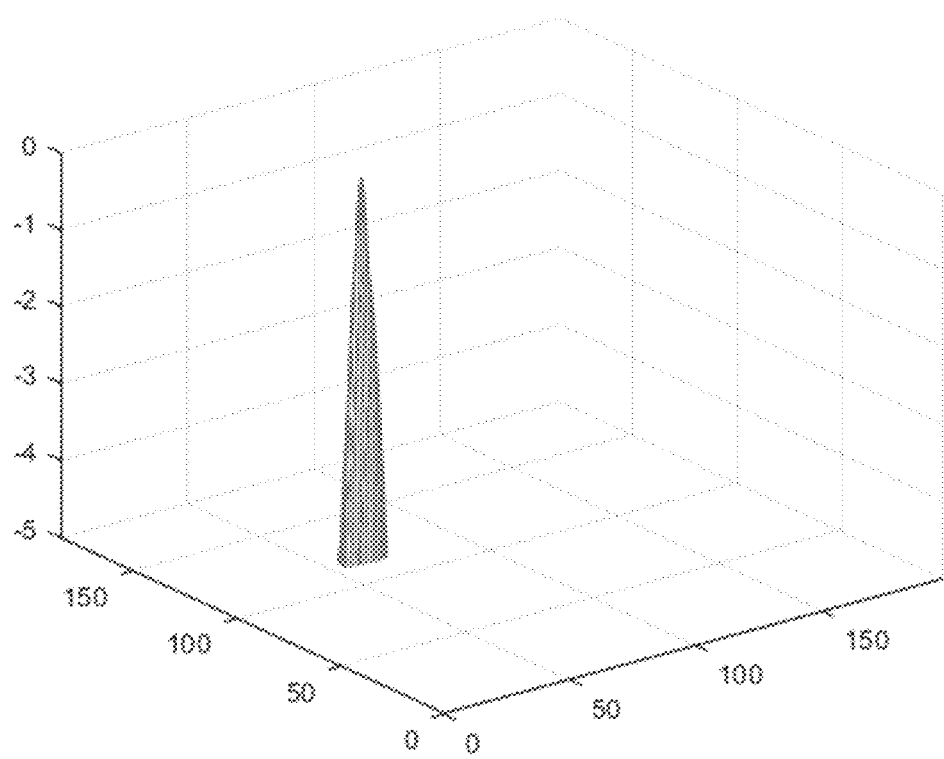
Figure 8B:
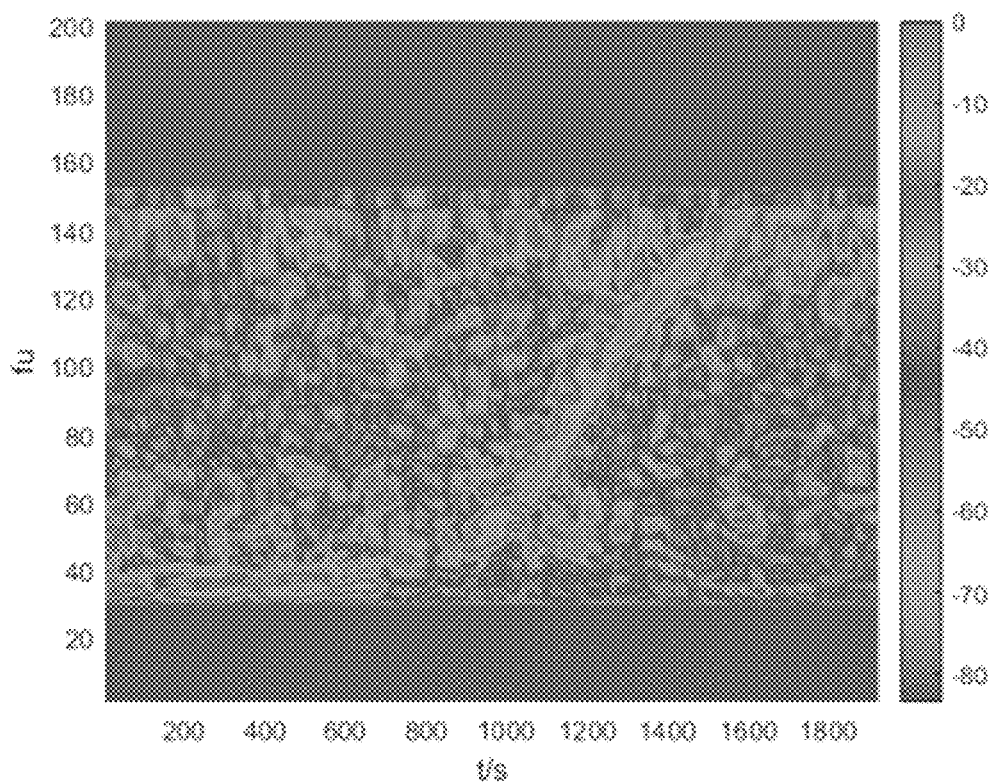
Figure 8B:
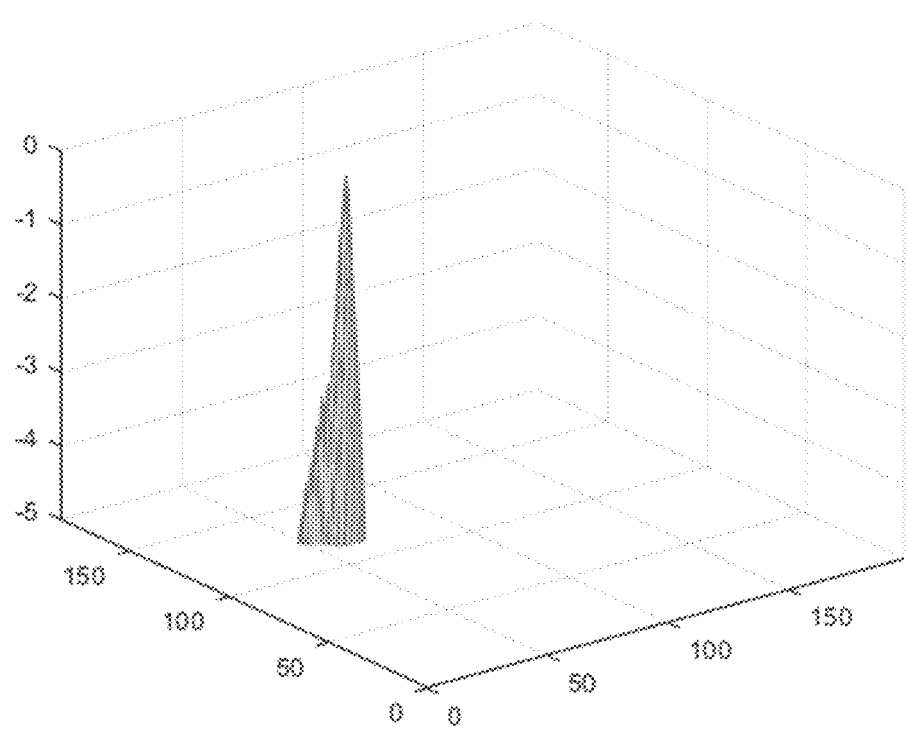
Figure 8C:
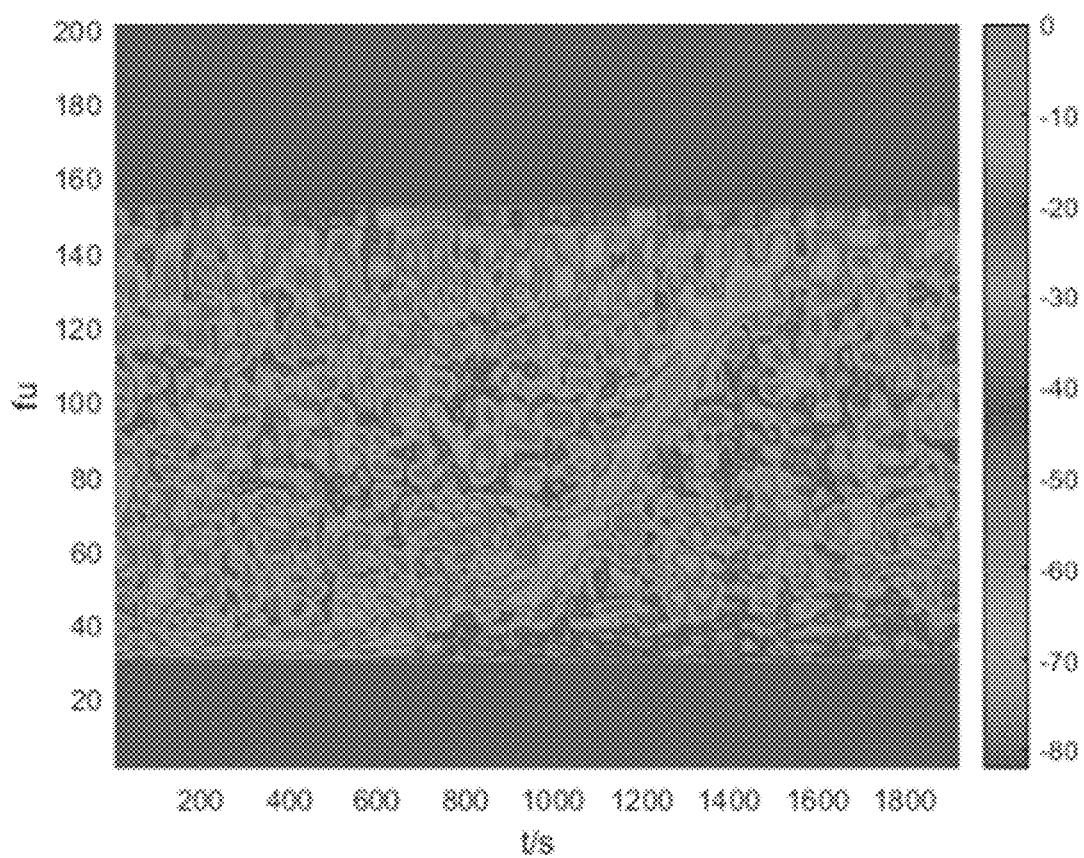
Figure 8C:
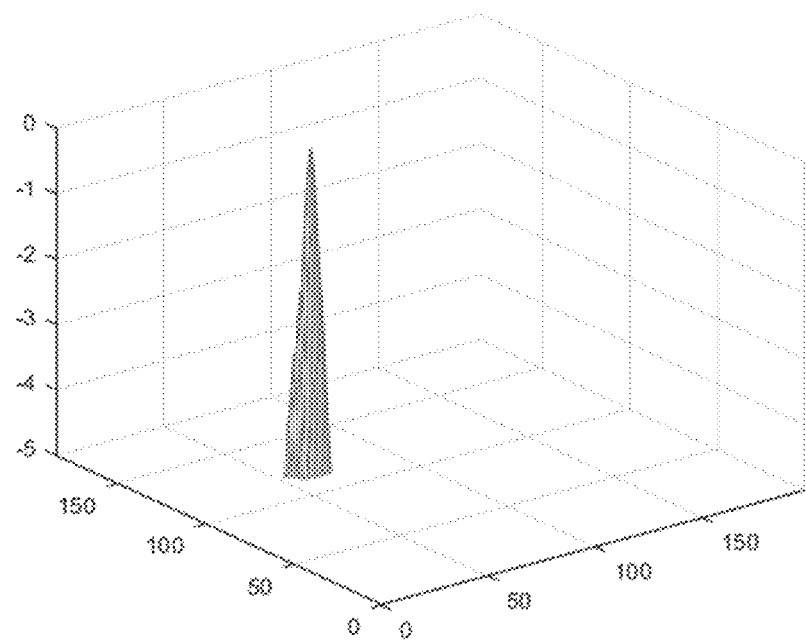
Figure 8D:
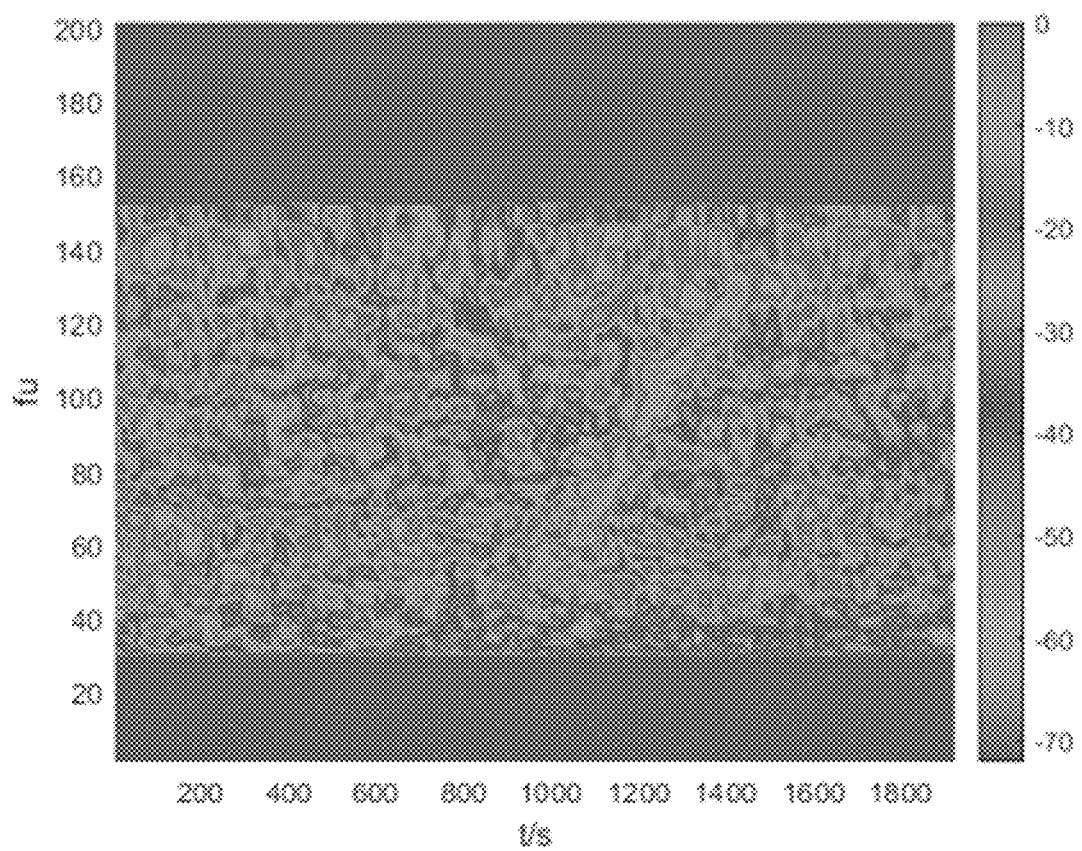
Figure 8D:
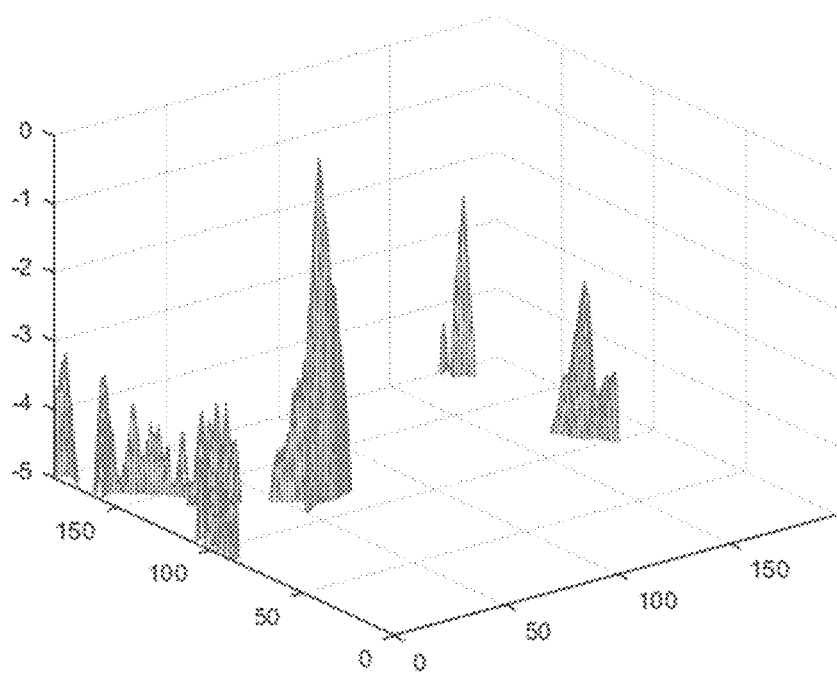

A transmitting signal frequency $f_0$ and a velocity v are searched, and a slice in the 3D space A:

$$f - \left(f_0 + f_0 \frac{v}{c}\cos\theta\right) = 0$$

can be determined according to the parameters, that is, the plane represented by the blue block diagram in FIG. 5.

As shown in FIGS. 8A-D, 0-32 min data of the Swellex96 S5 experiment is processed by the present disclosure, and compared with the LOFAR diagram in FIGS. 6A-D and azimuth history diagram in FIGS. 7A-D. The left figure is the slice taken from the space, and the right figure is the result after Radon transform of the slice.

The invention claimed is:

1. A method for detecting a moving target based on spatial slices of transformed spatio-temporal frequency space, comprising the following steps:
   step 1: segmenting a target radiated acoustic signal s(t) received by an M-element horizontal line array in an underwater acoustic environment with a low signal-to-noise ratio (SNR);
   step 2: performing N-point discrete Fourier transform (DFT) on the received signal on each array element in each period of time $\tau_p$ in step 1, wherein $N=T_0 \cdot f_s$;
   step 3: performing frequency domain beamforming on an array signal after each section of DFT in step 2, and performing stacking after compensating a phase difference between arrays brought by an azimuth $\alpha(\tau_p)$ of each primitive element;
   step 4: performing coordinate transformation on a frequency-azimuth-time (f-$\alpha$-t) three-dimensional (3D) matrix space obtained in step 3;
   step 5: taking a slice from the frequency-azimuth-time (f-cos $\theta$-t) 3D space subjected to the coordinate transformation obtained in step 4; and
   step 6: performing segmented Radon transform on the spatial slice obtained in step 5 to detect the target.

2. The method for detecting a moving target based on spatial slices of transformed spatio-temporal frequency space according to claim 1, wherein step 1 is specifically as follows:

$$s_m(\tau_p, n) = s((\tau_p - 1)T_b + n) \quad (1),$$

where $\tau_p = 1, 2, \ldots, P$, $n = 1, 2, \ldots, T_0 f_s$, and $m = 1, 2, \ldots, M$, and P represents a number of segments into which data is divided, $\tau_p$ represents a p-th segment of signal, $T_0$ represents a length of each segment of signal, in unit of second, $T_b$ represents a segmentation stride, in unit of second, $f_s$ is a sampling rate of the signal, $\tau_p$ represents a slow time, n represents a fast time, and m is an array element number.

3. The method for detecting a moving target based on spatial slices of transformed spatio-temporal frequency space according to claim 1, wherein step 2 is specifically as follows:

$$s(\tau_p, \omega) = \frac{1}{N} \sum_{n=0}^{N-1} A e^{i \vec{k} \cdot \vec{r}_0} e^{i\omega_p \tau_p} \begin{bmatrix} 1 \\ e^{-i\frac{2\pi f_0}{c} d \cos\alpha(\tau_p)} \\ \vdots \\ e^{-i\frac{2\pi f_0 (M-1)}{c} d \cos\alpha(\tau_p)} \end{bmatrix} e^{i(\omega_p - \omega)n}, \quad (2)$$

wherein
within $T_0$ seconds, a frequency $\omega_p$ and azimuth $\alpha(\tau_p)$ of the received signal are approximately unchanged, and $\omega_p = \omega_0 + \vec{k} \cdot \vec{v}$ is a frequency received by the array at a time $\tau_p$ after the Doppler effect caused by target movement, where $\vec{v}$ is a target velocity vector, and $\vec{k}$ is a wave number vector; and $\vec{r}_0$ is a distance vector between the target and a central receiving array element at an initial time, d is an array element spacing, and both $\omega_0$ and $f_0$ are frequencies of the target transmitting a single-frequency signal.

4. The method for detecting a moving target based on spatial slices of transformed spatio-temporal frequency space according to claim 3, wherein step 3 is specifically as follows:

$$S(\tau_p, \omega, \alpha) = \sum_{m=1}^{M} s_m(\tau_p, \omega) e^{i\frac{2\pi f_0 (m-1)}{c} d \cos\alpha} \quad (3)$$

$$= \frac{1}{N} \sum_{m=1}^{M} \sum_{n=0}^{N-1} A e^{i \vec{k} \cdot \vec{r}_0} e^{i\omega_p \tau_p} e^{i(\omega_p - \omega)n} e^{-i\frac{2\pi f_0 (m-1)}{c} d(\cos\alpha - \cos\alpha(\tau_p))},$$

where $\alpha = \alpha(\tau_p)$ represents the azimuth, M represents a number of array elements, m represents an m-th array element, $\tau_p$ represents a p-th segment of signal, i represents an imaginary unit, cos $\alpha$ represents cosine of the azimuth, c represents an acoustic velocity, N represents a number of points in each segment of the segmented signal, N−1 represents a point position, and $\vec{k}$ is the wave number vector; and $\vec{r}_0$ is the distance vector between the target and the central receiving array element at the initial time.

5. The method for detecting a moving target based on spatial slices of transformed spatio-temporal frequency space according to claim 1, wherein step 3 is specifically as follows:
   according to a mathematical expression of space transformation:

$$\begin{cases} f' = f \\ t' = t \\ \cos\theta = -\sin(\alpha + \gamma_0) \end{cases} \quad (4)$$

wherein $\gamma_0 \in [0, 360)$, and $\gamma_0$ is an angle measured clockwise from a true north line to a target course line,
searching the angle $\gamma_0$, and performing coordinate transformation as shown in Formula (4) on the (f-$\alpha$-t) 3D space according to a parameter to obtain a new 3D space (f-cos $\theta$-t):

$$S(f, \cos\theta, t) = e^{i \vec{k} \cdot \vec{r}_0} \delta(\cos\theta - \cos\theta(t)) \delta\left(f - \left[f_0 + f_0 \frac{v}{c} \cos\theta(t)\right]\right),$$

wherein
the signal is represented as a curve on a plane $$f - \left(f_0 + f_0 \frac{v}{c} \cos\theta\right) = 0$$

in the new 3D space.

6. The method for detecting a moving target based on spatial slices of transformed spatio-temporal frequency space according to claim 1, wherein step 5 is specifically as follows: searching a transmitting signal frequency $f_0$ and a velocity v, and determining a slice in the 3D space A:

$$f - \left(f_0 + f_0\frac{v}{c}\cos\theta\right) = 0$$

according to the parameters.

7. A computer readable storage medium, storing a computer program, wherein when executed by a processor, the computer program implements steps of the method according to claim 1.

8. The computer readable storage medium according to claim 7, wherein step 1 is specifically as follows:

$$s_m(\tau_p, n) = s((\tau_p - 1)T_b + n) \qquad (1),$$

where $\tau_p = 1, 2, \ldots, P$, $n = 1, 2, \ldots, T_0 f_s$, and $m = 1, 2, \ldots, M$, and P represents a number of segments into which data is divided, $\tau_p$ represents a p-th segment of signal, $T_0$ represents a length of each segment of signal, in unit of second, $T_b$ represents a segmentation stride, in unit of second, $f_s$ is a sampling rate of the signal, $\tau_p$ represents a slow time, n represents a fast time, and m is an array element number.

9. The computer readable storage medium according to claim 7, wherein step 2 is specifically as follows:

$$s(\tau_p, \omega) = \frac{1}{N}\sum_{n=0}^{N-1} Ae^{i\vec{k}\cdot\vec{r}_0}e^{i\omega_p\tau_p}\begin{bmatrix}1\\e^{-i\frac{2\pi f_0}{c}d\cos\alpha(\tau_p)}\\\ldots\\e^{-i\frac{2\pi f_0(M-1)}{c}d\cos\alpha(\tau_p)}\end{bmatrix}e^{i(\omega_p-\omega)n}, \qquad (2)$$

wherein within $T_0$ seconds, a frequency $\omega_p$ and azimuth $\alpha(\tau_p)$ of the received signal are approximately unchanged, and $\omega_p = \omega_0 + \vec{k}\cdot\vec{v}$ is a frequency received by the array at a time $\tau_p$ after the Doppler effect caused by target movement, where $\vec{v}$ is a target velocity vector, and $\vec{k}$ is a wave number vector; and $\vec{r}_0$ is a distance vector between the target and a central receiving array element at an initial time, d is an array element spacing, and both $\omega_0$ and $f_0$ are frequencies of the target transmitting a single-frequency signal.

10. The computer readable storage medium according to claim 9, wherein step 3 is specifically as follows:

$$S(\tau_p, \omega, \alpha) = \sum_{m=1}^{M} s_m(\tau_p, \omega)e^{i\frac{2\pi f_0(m-1)}{c}d\cos\alpha} \qquad (3)$$
$$= \frac{1}{N}\sum_{m=1}^{M}\sum_{n=0}^{N-1} Ae^{i\vec{k}\cdot\vec{r}_0}e^{i\omega_p\tau_p}e^{i(\omega_p-\omega)n}e^{-i\frac{2\pi f_0(m-1)}{c}d(\cos\alpha - \cos\alpha(\tau_p))}$$

where $\alpha = \alpha(\tau_p)$ represents the azimuth, M represents a number of array elements, m represents an m-th array element, $\tau_p$ represents a p-th segment of signal, i represents an imaginary unit, cos $\alpha$ represents cosine of the azimuth, c represents an acoustic velocity, N represents a number of points in each segment of the segmented signal, N−1 represents a point position, and $\vec{k}$ is the wave number vector; and $\vec{r}_0$ is the distance vector between the target and the central receiving array element at the initial time.

11. The computer readable storage medium according to claim 7, wherein step 3 is specifically as follows:

according to a mathematical expression of space transformation:

$$\begin{cases}f' = f\\t' = t\\\cos\theta = -\sin(\alpha - \gamma_0)\end{cases} \qquad (4)$$

wherein $\gamma_0 \in [0, 360)$, and $\gamma_0$ is an angle measured clockwise from a true north line to a target course line, searching the angle $\gamma_0$, and performing coordinate transformation as shown in Formula (4) on the (f-α-t) 3D space according to the parameter to obtain a new 3D space (f-cos θ-t):

$$S(f, \cos\theta, t) = e^{i\vec{k}\cdot\vec{r}_0}\delta(\cos\theta - \cos\theta(t))\delta\left(f - \left[f_0 + f_0\frac{v}{c}\cos\theta(t)\right]\right),$$

wherein the signal is represented as a curve on a plane $$f - \left(f_0 + f_0\frac{v}{c}\cos\theta\right) = 0$$

in the new 3D space.

12. The computer readable storage medium according to claim 7, wherein step 5 is specifically as follows: searching a transmitting signal frequency $f_0$ and a velocity v, and determining a slice in the 3D space A:

$$f - \left(f_0 + f_0\frac{v}{c}\cos\theta\right) = 0$$

according to the parameters.

13. An electronic device, comprising a processor, a communication interface, a memory, and a communication bus, wherein the processor, the communication interface, and the memory communicate with each other through the communication bus;

the memory is configured to store a computer program; and the processor is configured to implement steps of the method according to claim 1 when executing the program stored in the memory.

14. The electronic device according to claim 13, wherein step 1 is specifically as follows:

$$s_m(\tau_p, n) = s((\tau_p - 1)T_b + n) \qquad (1),$$

where $\tau_p = 1, 2, \ldots, P$, $n = 1, 2, \ldots, T_0 f_s$, and $m = 1, 2, \ldots, M$, and P represents a number of segments into which data is divided, $\tau_p$ represents a p-th segment of signal, $T_0$ represents a length of each segment of signal, in unit of second, $T_b$ represents a segmentation stride, in unit of second, $f_s$ is a sampling rate of the signal, $\tau_p$ represents a slow time, n represents a fast time, and m is an array element number.

15. The electronic device according to claim 13, wherein step 2 is specifically as follows:

$$s(\tau_p, \omega) = \frac{1}{N}\sum_{n=0}^{N-1} A e^{i\vec{k}\cdot\vec{r}_0} e^{i\omega_p \tau_p} \begin{bmatrix} 1 \\ e^{-i\frac{2\pi f_0}{c}d\cos\alpha(\tau_p)} \\ \ldots \\ e^{-i\frac{2\pi f_0(M-1)}{c}d\cos\alpha(\tau_p)} \end{bmatrix} e^{i(\omega_p-\omega)n}, \quad (2)$$

within $T_0$ seconds, a frequency $\omega_p$ and azimuth $\alpha(\tau_p)$ of the received signal are approximately unchanged, and $\omega_p = \omega_0 + \vec{k}\cdot\vec{v}$ is a frequency received by the array at a time $\tau_p$ after the Doppler effect caused by target movement, where $\vec{v}$ is a target velocity vector, and $\vec{k}$ is a wave number vector; and $\vec{r}_0$ is a distance vector between the target and a central receiving array element at an initial time, d is an array element spacing, and both $\omega_0$ and $f_0$ are frequencies of the target transmitting a single-frequency signal.

16. The electronic device according to claim 15, wherein step 3 is specifically as follows:

$$S(\tau_p, \omega, \alpha) = \sum_{m=1}^{M} s_m(\tau_p, \omega) e^{i\frac{2\pi f_0(m-1)}{c}d\cos\alpha} \quad (3)$$

$$= \frac{1}{N}\sum_{m=1}^{M}\sum_{n=0}^{N-1} A e^{i\vec{k}\cdot\vec{r}_0} e^{i\omega_p \tau_p} e^{i(\omega_p-\omega)n} e^{-i\frac{2\pi f_0(m-1)}{c}d(\cos\alpha-\cos\alpha(\tau_p))},$$

where $\alpha = \alpha(\tau_p)$ represents the azimuth, M represents a number of array elements, m represents an m-th array element, $\tau_p$ represents a p-th segment of signal, i represents an imaginary unit, $\cos\alpha$ represents cosine of the azimuth, c represents an acoustic velocity, N represents a number of points in each segment of the segmented signal, N−1 represents a point position, and $\vec{k}$ is the wave number vector; and $\vec{r}_0$ is the distance vector between the target and the central receiving array element at the initial time.

17. The electronic device according to claim 13, wherein step 3 is specifically as follows:

according to a mathematical expression of space transformation:

$$\begin{cases} f' = f \\ t' = t \\ \cos\theta = -\sin(\alpha - \gamma_0) \end{cases} \quad (4)$$

wherein $\gamma_0 \in [0, 360)$, and $\gamma_0$ is an angle measured clockwise from a true north line to a target course line, searching the angle $\gamma_0$, and performing coordinate transformation as shown in Formula (4) on the (f-$\alpha$-t) 3D space according to the parameter to obtain a new 3D space (f-$\cos\theta$-t):

$$S(f, \cos\theta, t) = e^{i\vec{k}\cdot\vec{r}_0}\delta(\cos\theta - \cos\theta(t))\delta\left(f - \left[f_0 + f_0\frac{v}{c}\cos\theta(t)\right]\right),$$

wherein the signal is represented as a curve on a plane $$f - \left(f_0 + f_0\frac{v}{c}\cos\theta\right) = 0$$

in the new 3D space.

18. The electronic device according to claim 13, wherein step 5 is specifically as follows:

searching a transmitting signal frequency $f_0$ and a velocity v, and determining a slice in the 3D space A:

$$f - \left(f_0 + f_0\frac{v}{c}\cos\theta\right) = 0$$

according to the parameters.

* * * * *